United States Patent
Jung et al.

(10) Patent No.: US 11,943,257 B2
(45) Date of Patent: Mar. 26, 2024

(54) URL REWRITING

(71) Applicant: Abnormal Security Corporation, San Francisco, CA (US)

(72) Inventors: Yea So Jung, San Mateo, CA (US); Su Li Debbie Tan, San Francisco, CA (US); Kai Jing Jiang, San Francisco, CA (US); Fang Shuo Deng, San Francisco, CA (US); Yu Zhou Lee, San Francisco, CA (US); Rami F. Habal, San Francisco, CA (US); Oz Wasserman, San Francisco, CA (US); Sanjay Jeyakumar, San Francisco, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 18/086,548

(22) Filed: Dec. 21, 2022

(65) Prior Publication Data
US 2023/0208876 A1    Jun. 29, 2023

Related U.S. Application Data

(60) Provisional application No. 63/293,044, filed on Dec. 22, 2021.

(51) Int. Cl.
*H04L 9/40*     (2022.01)
*G06F 9/54*     (2006.01)

(52) U.S. Cl.
CPC .......... *H04L 63/1483* (2013.01); *G06F 9/547* (2013.01); *H04L 63/1416* (2013.01)

(58) Field of Classification Search
CPC .. H04L 63/1483; H04L 63/1416; G06F 9/547
USPC ........................................................... 726/23
See application file for complete search history.

(56) References Cited

U.S. PATENT DOCUMENTS

| | | | |
|---|---|---|---|
| 8,015,250 B2 * | 9/2011 | Kay ...................... | H04L 51/212 709/225 |
| 8,839,401 B2 * | 9/2014 | Starink ................. | G06F 21/567 726/11 |
| 8,904,168 B1 * | 12/2014 | Emigh ................ | H04L 63/1425 715/239 |
| 8,984,605 B2 * | 3/2015 | Bauckman ............ | H04L 51/224 726/7 |
| 9,178,901 B2 * | 11/2015 | Xue ..................... | H04L 63/1483 |
| 9,344,449 B2 * | 5/2016 | Brown ................ | H04L 63/1433 |
| 10,601,865 B1 | 3/2020 | Mesdaq | |
| 10,686,826 B1 * | 6/2020 | Goutal ................ | G06F 18/2178 |
| 10,880,322 B1 * | 12/2020 | Jakobsson ............... | H04L 51/08 |
| 11,468,185 B2 * | 10/2022 | Hayes ................. | H04L 63/1416 |
| 2007/0039038 A1 * | 2/2007 | Goodman ........... | H04L 63/1483 726/2 |
| 2008/0147669 A1 | 6/2008 | Liu | |

(Continued)

*Primary Examiner* — Thanh T Le
(74) *Attorney, Agent, or Firm* — Van Pelt, Yi & James LLP

(57) ABSTRACT

Selectively rewriting URLs is disclosed. An indication is received that a message has arrived at a user message box. A determination is made that the message includes a first link to a first resource. The first link is analyzed to determine whether the first link is classified as a non-rewrite link. In response to determining that the first link is not classified as a non-rewrite link, a first replacement link is generated for the first link.

28 Claims, 16 Drawing Sheets

(56) References Cited

U.S. PATENT DOCUMENTS

| | | | | |
|---|---|---|---|---|
| 2010/0306845 | A1* | 12/2010 | Vaithilingam | G06Q 10/107 709/206 |
| 2012/0158626 | A1* | 6/2012 | Zhu | G06F 21/56 726/22 |
| 2014/0164418 | A1* | 6/2014 | Etchegoyen | G06F 21/316 707/758 |
| 2014/0181216 | A1* | 6/2014 | Liebmann | H04L 51/08 709/206 |
| 2014/0201835 | A1* | 7/2014 | Emigh | G06F 21/55 726/23 |
| 2014/0259158 | A1* | 9/2014 | Brown | H04L 51/08 726/22 |
| 2014/0331319 | A1* | 11/2014 | Munro, IV | H04L 63/1441 726/22 |
| 2016/0036971 | A1* | 2/2016 | Velthuis | H04L 51/212 455/466 |
| 2016/0105283 | A1* | 4/2016 | Mityagin | H04L 9/12 380/279 |
| 2016/0127399 | A1* | 5/2016 | Starink | H04L 51/212 726/23 |
| 2017/0078321 | A1* | 3/2017 | Maylor | H04L 63/08 |
| 2017/0180378 | A1* | 6/2017 | Tyler | H04L 63/1433 |
| 2018/0375877 | A1* | 12/2018 | Jakobsson | G06F 16/955 |
| 2020/0074079 | A1* | 3/2020 | Bae | H04L 63/1416 |
| 2020/0358798 | A1* | 11/2020 | Maylor | H04L 63/1433 |
| 2020/0404000 | A1* | 12/2020 | Hayes | H04L 51/08 |
| 2021/0203692 | A1* | 7/2021 | Nunes | H04L 63/1483 |
| 2021/0390510 | A1* | 12/2021 | Wuslich | H04L 63/1441 |
| 2022/0021700 | A1* | 1/2022 | Devlin | H04L 63/1441 |
| 2022/0038498 | A1* | 2/2022 | Kras | G09B 19/0053 |
| 2022/0210146 | A1* | 6/2022 | Dhanabalan | H04L 63/1483 |

* cited by examiner

FIGURE 3

Dashboard | Threat Log | Abnormal Cases | Abuse Mailbox

General Settings
- User Management
- Tenant Management
- 3rd Party Integrations
- Notifications
- Safelist
- Audit Logs

Feature Settings
- Inbound Security
- Account Takeover
- Abuse Mailbox

Feature Settings
Inbound Security

Overall Setup    User Banner Templates —304

---

URL Re-write Options

Abnormal's URL Protect rewrites links in suspicious messages that are not auto-remediated. End user can explore links in Abnormal's sandbox environment. You can gain visibility into link clicks.

◉ Enable URL-Rewrite    — 302    Selected
- URLs in suspicious messages are rewritten with urlprotect.com.
- Go to Dashboard to see top URL-click users.
- When available, URL click info will appear in Search and Respond.

◯ Disable URL-Rewrite
Suspicious messages will no longer have URL-rewrites.

Enable/Disable User Banner

| Tenant | Banner Usage | Banner Template | End User Coverage |
|---|---|---|---|
| All tenants | ● Enable | Default Template | 5 users |

Trending Attacks

Over the entire {interval_size}-day period, Abnormal Security detected {most_common_attack_type}, {second_most_common_attack_type}, and {third_most_common_attack_type} as the most common attack types for your organization. For reference, the most common attack types in the previous {interval_size}-day period were {prev_most_common_attack_type}, {prev_second_most_common_attack_type}, and {prev_third_most_common_attack_type}.

| Attack Type | Attack Count | | vs. Previous Period | |
|---|---|---|---|---|
| ○ Extortion<br>E.g. Vendor impersonation | 74 | 37% | +1 | +37% |
| ○ Credential Phishing<br>E.g. Employee impersonation, Partner employee impersonation | 55 | 28% | -25 | -28% |
| ○ Malware & Ransomware<br>Attempt to extract ransom using scare tactics or intimidation | 47 | 24% | 0 | 0% |
| ○ Spam<br>E.g. Spam, Malware, Ransomware, Extortion | 22 | 11% | +2 | +11% |
| ○ VIP Impersonation (Requesting Giftcard)<br>E.g. Spam, Malware, Ransomware, Extortion | 22 | 11% | -23 | -37% |

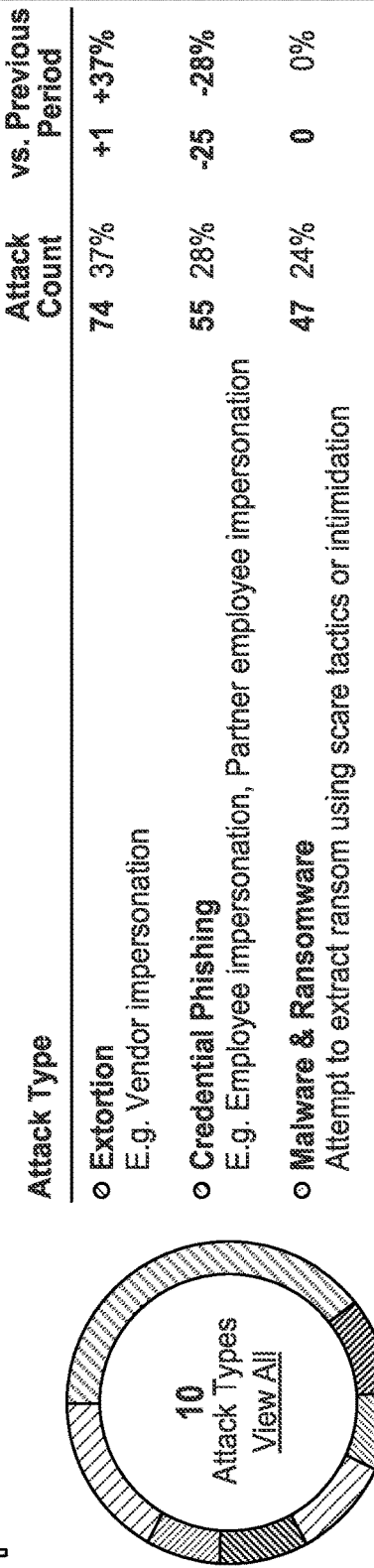

10 Attack Types
View All

Attack vector breakdown

Over the past {interval_size} days, Abnormal Security found that {links were, attachments were, text was} the most prominent means of attack against your organization.

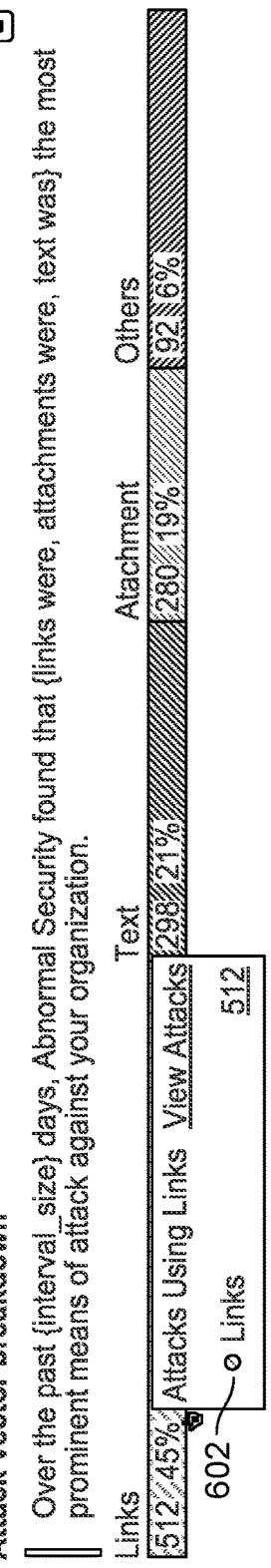

| Links | Text | Attachment | Others |
|---|---|---|---|
| 512 / 45% | 298 / 21% | 280 / 19% | 92 / 6% |

Attacks Using Links  View Attacks  512

602 — ○ Links

FIGURE 6

| Abnormal Security | Dashboard | Threat Log | Abnormal Cases | Email Finder | 👤 John Doe ⌄ | evil.com/bad-form ⬇

[∞ Suspicious Link] ⏱ Oct 27th 3:47pm  @ Sender       [⌄ Safelist] [⊙ Remediate] [⌃][⌄]

Abnormal security has flagged this as a [∞ Suspicious Link]

△ Link Analysis: Link Redirects To Unknown Destination

Link consists of 1 or more redirect links that may lead to phishing landing pages. This is a common technique for attacks to mask malicious payload behind a legitimate link.

△ Uncommon And Never-Never-Been Link

We have not come across this link within your email environment or from sender "john.doe@company.com (Suspicious icon)

Link Analysis

| | |
|---|---|
| URL | http://evil.com/badform |
| Domain | evil.com |
| Domain age | 2 months old |
| Registry Expiration | 2021-06-26 16:37:14 UTC |
| Created | 2012-06-26 16:37:14 UTC |
| IP | 199.22.39.8 |
| Geolocation | Toronto, CA |
| Registrar Info | Google Domain |
| | |
| Malware? | ✗ |
| Contains redirect | ✗ |
| Phishing site | ✗ |
| Abuse score | ✗ |
| | |
| First seen | 3 months ago |
| Last interaction | 2 min ago |

Link Preview: evil.com/bad-form       Copy Link  Anyrun

Domain Name Registration Data Lookup

Enter a domain name      Frequently Asked Questions (FAQ)

[Enter a domain]   [Lookup]

By submitting any personal data, I acknowledge and agree that the personal data submitted by me will be processed in accordance with the ICANN Privacy Policy, and agree to abide by the website Terms of Service and the Domain Name Registration Data Lookup Terms of Use.

Campaign with re-written URL(4)

| Email Campaign | Detected Time | User(s) Involved | Analysis |
|---|---|---|---|
| Email 1 | 3 min ago<br>July 27 3:47PM PDT | 4 Users | ⦿ SSN Number(s)   ◇ External Recipients<br>♂ Unusual Sending Pattern   ♂ Sensitive Content |
| Email 2 | 20 min ago<br>July 27 3:47PM PDT | 382 Users | ⦿ SSN Number(s)   ◇ External Recipients<br>♂ Unusual Sending Pattern   ♂ Sensitive Content |
| Email 3 | 1 hour ago<br>July 27 3:47PM PDT | Zach Newton<br>Znewton@company.com | ⦿ SSN Number(s)   ◇ External Recipients<br>♂ Unusual Sending Pattern   ♂ Sensitive Content |
| Email 4 | 3 min ago<br>July 27 3:47PM PDT | 8,028 Users | ⦿ SSN Number(s)   ◇ External Recipients<br>♂ Unusual Sending Pattern   ♂ Sensitive Content |

FIGURE 8 (Cont. 2)

URL REWRITING

CROSS REFERENCE TO OTHER APPLICATIONS

This application claims priority to U.S. Provisional Patent Application No. 63/293,044 entitled URL REWRITING filed Dec. 22, 2021 which is incorporated herein by reference for all purposes.

BACKGROUND OF THE INVENTION

Email connects millions of individuals in real time. Technological advancements have incentivized malicious actors (also referred to as "attackers") to send malicious emails in greater numbers than ever before. Because email now represents the primary communication channel for most enterprises (also referred to herein as "businesses," "companies," or "organizations"), it is a primary point of entry for attackers. Unfortunately, attackers are constantly innovating, not only lunching new attack campaigns, but also adjusting the strategies they employ to evade detection. Accordingly, there is an ongoing need to improve email security.

BRIEF DESCRIPTION OF THE DRAWINGS

Various embodiments of the invention are disclosed in the following detailed description and the accompanying drawings.

FIG. 3 illustrates an example of an interface.

FIG. 6 illustrates an example of an administrative interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Threat Detection Platform

Figure 1A:
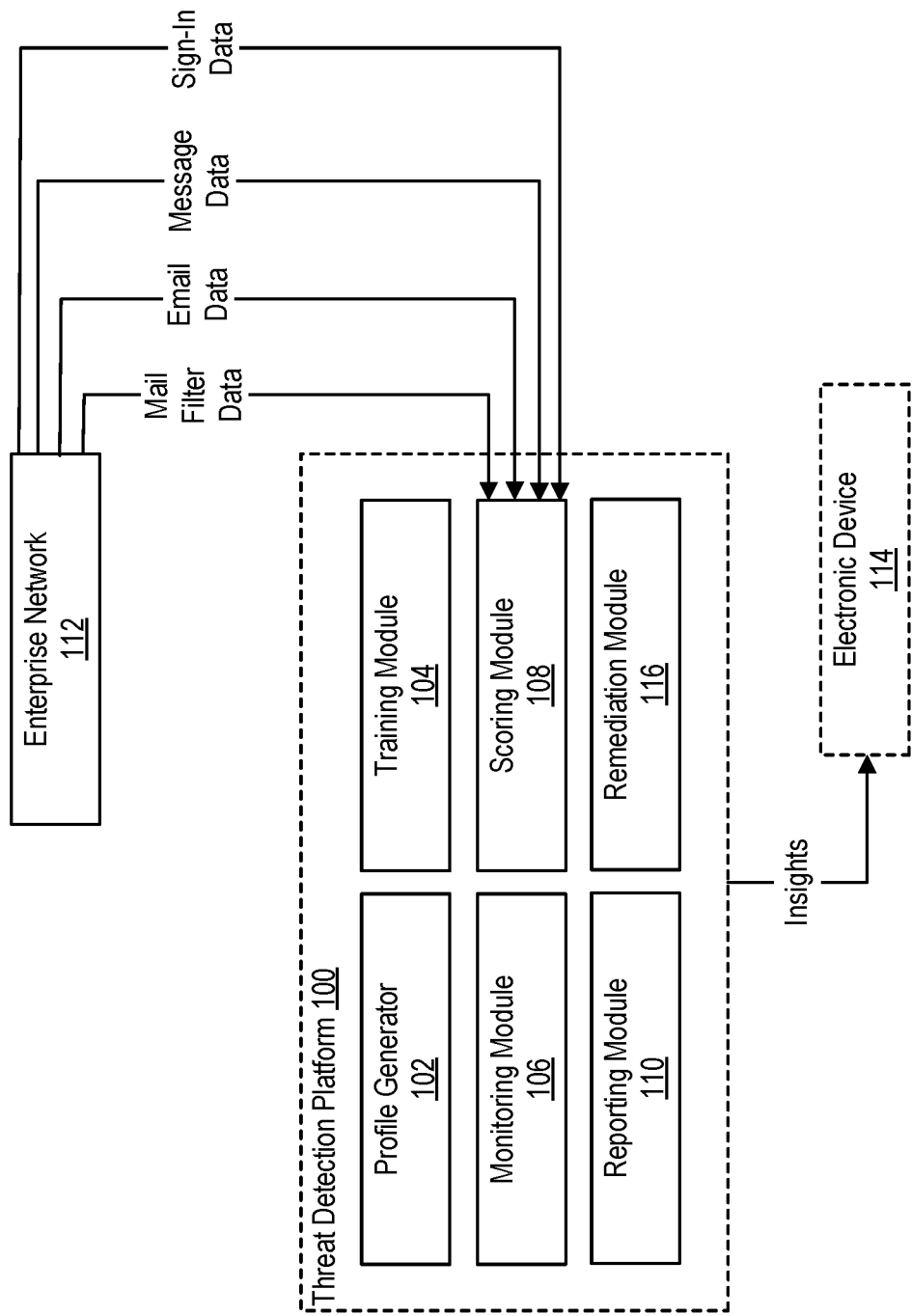
FIG. 1A depicts an example of a threat detection platform.

FIG. 1A depicts an example of a threat detection platform that is configured to examine the digital conduct of accounts associated with employees to detect threats to the security of an enterprise in accordance with various embodiments. The threat detection platform can apply one or more models to incoming emails to quantify the risk posed to the security of an enterprise in near real time. These models can examine the context and content of incoming emails to determine whether any of those emails are representative of a business email compromise (BEC), phishing, spamming, etc. In order to protect against novel threats, the models can be consistently trained (and re-trained) using up-to-date information. This information can include insights gained by the threat detection platform and/or insights provided by other entities, such as third party services or individuals. Examples of these individuals include researchers, security operations center (SOC) analysts, information technology (IT) professionals, and end users (e.g., reporting false negatives to the threat detection platform). Regardless of its source, the information can be collected and then provided, as input, to a pipeline for retraining models (e.g., rapidly retraining an NLP pipeline). The term "pipeline," as used herein, generally refers to a series of steps that—when performed in sequence—automate a retraining process by processing, filtering, extracting, or transforming the information and then using the information to retrain the models used by the threat detection platform.

Embodiments are described herein with reference to certain types of attacks. The features of those embodiments can similarly be applied to other types of attacks. As an example, while embodiments may be described in the context of retraining models to identify never-before-seen phishing attacks, a threat detection platform can also rapidly train its models to identify never-before-seen spamming attacks or spoofing attacks. Moreover, embodiments may be described in the context of certain types of digital activities. The features of those embodiments can similarly be applied to other types of digital activities. Thus, while an embodiment may be described in the context of examining emails, a threat detection platform can additionally or alternatively be configured to examine messages, mail filters, sign-in events, etc.

While embodiments may be described in the context of computer-executable instructions, aspects of the technology described herein can be implemented via hardware, firmware, or software. As an example, aspects of the threat detection platform can be embodied as instruction sets that are executable by a computer program that offers support for discovering, classifying, and then remediating threats to the security of an enterprise.

References in this description to "an embodiment" or "one embodiment" mean that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," and/or variants thereof are intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers to software components, firmware components, or hardware components. Modules are typically functional components that generate one or more outputs based on one or more inputs. As an example, a computer program may include multiple modules responsible for completing different tasks or a single module responsible for completing all tasks. Unless otherwise specified, an example way of implementing a module referred to herein is as a set of one or more python scripts which may make use of various publicly available libraries, toolkits, etc.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

Accounts are digital profiles with which employees can engage in digital activities. These digital profiles are typically used to perform activities such as exchanging emails and messages, and thus may also be referred to as "email accounts" or "messaging accounts" herein. Further, various of the techniques described herein can be extended to other types of accounts as applicable (e.g., accounts on productivity/collaboration platforms, etc.) "Digital conduct" refers to the digital activities that are performed with those accounts. Examples of digital activities include transmitting and receiving communications; creating, modifying, and deleting filters to be applied to incoming communications; initiating sign-in activities; and the like. Examples of communications include emails and messages. As shown in FIG. 1A, threat detection platform 100 includes a profile generator 102, a training module 104, a monitoring module 106, a scoring module 108, a reporting module 110, and a remediation module 116. Some embodiments of threat detection platform 100 include a subset of these components, while other embodiments of the threat detection platform 100 include additional components that are not shown in FIG. 1A.

At a high level, threat detection platform 100 can acquire data related to digital conduct of accounts associated with employees and then determine, based on an analysis of the data, how to handle security threats in a targeted manner. Examples of such data include information related to emails, messages, mail filters, and sign-in activities. These data are not necessarily obtained from the same source. As an example, data related to emails can be acquired from an email service (e.g., Microsoft Office 365) while data related to messages may be acquired from a messaging service (e.g., Slack). Threat detection platform 100 can identify security threats based on an analysis of incoming emails (e.g., the content of the body, the email address of the sender, etc.), metadata accompanying the incoming emails (e.g., information regarding the sender, recipient, origin, time of transmission, etc.), attachments, links, and/or other suitable data.

Threat detection platform 100 can be implemented, partially or entirely, within an enterprise network 112, a remote computing environment (e.g., through which the data regarding digital conduct is routed for analysis), a gateway, or another suitable location or combinations thereof. The remote computing environment can belong to, or be managed by, the enterprise or another entity. In some embodiments, threat detection platform 100 is integrated into the enterprise's email system (e.g., at a secure email gateway (SEG)) as part of an inline deployment. In other embodiments, threat detection platform 100 is integrated into the enterprise's email system via an application programming interface (API) such as the Microsoft Outlook API. In such embodiments, threat detection platform 100 can obtain data via the API. Threat detection platform 100 can thus supplement and/or supplant other security products employed by the enterprise.

In some embodiments, threat detection platform 100 is maintained by a threat service (also referred to herein as a "security service") that has access to multiple enterprises' data. In this scenario, threat detection platform 100 can route data that is, for example, related to incoming emails to a computing environment managed by the security service. An example of such a computing environment is as one or more instances on Amazon Web Services (AWS). Threat detection platform 100 can maintain one or more databases for each enterprise it services that include, for example, organizational charts (and/or other user/group identifiers/memberships, indicating information such as "Alice is a member of the Engineering group" and "Bob is a member of the Marketing group"), attribute baselines, communication patterns, etc. Additionally or alternatively, threat detection platform 100 can maintain federated databases that are shared among multiple entities. Examples of federated databases include databases specifying vendors and/or individuals who have been deemed fraudulent, domains from which incoming emails determined to represent security threats originated, etc. The security service can maintain different instances of threat detection platform 100 for different enterprises, or the security service may maintain a single instance of threat detection platform 100 for multiple enterprises, as applicable. The data hosted in these instances can be obfuscated, encrypted, hashed, depersonalized (e.g., by removing personal identifying information), or otherwise secured or secreted as applicable. Accordingly, in various embodiments, each instance of threat detection platform 100 is able to access/process data related to the accounts associated with the corresponding enterprise(s).

In some embodiments, threat detection platform 100 is maintained by the enterprise whose accounts are being monitored—either remotely or on premises. In this scenario, all relevant data is hosted by the enterprise itself, and any information to be shared across multiple enterprises (if applicable) can be transmitted to a computing system that is maintained by the security service or a third party, as applicable.

As shown in FIG. 1A, profile generator 102, training module 104, monitoring module 106, scoring module 108, reporting module 110, and remediation module 116 can be integral parts of the threat detection platform 100. Alternatively, these components can be implemented individually, or in various combinations, while operating "alongside" threat detection platform 100. For example, reporting module 110 can be implemented in a remote computing environment to which the threat detection platform 100 is communicatively connected across a network. As mentioned above, threat detection platform 100 can be implemented by a security service on behalf of an enterprise or the enterprise itself. In some embodiments, aspects of threat detection platform 100 are provided by a web-accessible computer program operating on a computer server or a distributed computing system. For example, an individual can interface with threat detection platform 100 through a web browser that is executing on an electronic computing device (also referred to herein as an "electronic device" or "computing device" 114).

Enterprise network 112 can be a mobile network, wired network, wireless network, or some other communication network (or multiple of any/all of such networks) maintained by the enterprise or an operator on behalf of the enterprise. As noted above, the enterprise can use a security service to examine communications (among other things) to discover potential security threats. The enterprise may grant permission to the security service to monitor the enterprise network 112 by examining emails (e.g., incoming emails and/or outgoing emails) and then handling those emails that represent security threats. For example, threat detection platform 100 can be permitted to remediate threats posed by those emails (e.g., by using an API made available by an email service provider such as a cloud-based email service provider to move or delete such messages), or the threat detection platform 100 may be permitted to surface notifications regarding the threats posed by those emails (and/or that a recipient or sender account is likely to have been compromised, etc.), or combinations thereof. In some embodiments, the enterprise further grants permission to the security service to obtain data regarding other digital activities involving the enterprise (and, more specifically, employees of the enterprise) in order to build a profile that specifies communication patterns, behavioral traits, normal context of emails, normal content of emails, etc. For example, threat detection platform 100 may identify the filters that have been created and/or destroyed by each employee to infer whether any significant variations in behavior have occurred. Such filters may comprise rules manually specified by the user (e.g., by the user explicitly interacting with tools made available by an email service) and/or may also be inferred based on users' interactions with their mail (e.g., by obtaining from the email service log data indicating which messages the user has moved from an inbox to a folder, or vice versa). As another example, threat detection platform 100 may examine the emails or messages received by a given employee to establish the characteristics of normal communications (and thus be able to identify abnormal communications).

Threat detection platform 100 can manage one or more databases in which data can be stored. Examples of such data include enterprise data (e.g., email data, message data, sign-in data, and mail filter data), remediation policies, communication patterns, behavioral traits, etc. The data stored in the database(s) can be determined by threat detection platform 100 (e.g., learned from data available on enterprise network 112), provided by the enterprise, or retrieved from an external database (e.g., associated with LinkedIn, Microsoft Office 365, or G Suite) as applicable. Threat detection platform 100 can also store outputs produced by the various modules, including machine- and human-readable information regarding insights into threats and any remediation actions that were taken.

As shown in FIG. 1A, threat detection platform 100 includes a profile generator 102 that is responsible for generating one or more profiles for the enterprise. For example, profile generator 102 can generate a separate profile for each account associated with an employee of the enterprise based on sign-in data, message data, email data, and/or mail filter data, etc. Additionally or alternatively, profiles can be generated for business groups, organizational groups, or the enterprise as a whole. By examining data obtained from enterprise network 112, profile generator 102 can discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates, etc.), etc. This information can be populated into the profiles so that each profile can be used as a baseline for what constitutes normal activity by the corresponding account (or group of accounts).

An example profile includes a number of behavioral traits associated with a given corresponding account. For example, profile generator 102 can determine behavioral traits based on sign-in data, message data, email data, and/or mail filter data obtained from enterprise network 112 or another source (e.g., a collaboration suite via an API). Email data can include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. Profile generator 102 can use the aforementioned information to build a profile for each email account that represents a model of normal behavior of the corresponding employee. The profiles can be helpful in identifying the digital activities and communications that indicate that a security threat may exist.

Monitoring module 106 is responsible for monitoring communications (e.g., messages and emails) handled by the enterprise network 112. These communications can include incoming emails (e.g., external and internal emails) received by accounts associated with employees of the enterprise, outgoing emails (e.g., external and internal emails) transmitted by those accounts, and messages exchanged between those accounts. In some embodiments, monitoring module 106 is able to monitor incoming emails in near real time so that appropriate action can be taken, in a timely fashion, if a malicious email is discovered. For example, if an incoming email is determined to be representative of a phishing attack (e.g., based on an output produced by scoring module 108), the incoming email can be prevented from reaching its intended destination by the monitoring module 106 or another applicable component or set of components. In some embodiments, monitoring module 106 is able to monitor communications only upon threat detection platform 100 being granted permission by the enterprise (and thus given access to enterprise network 112).

Scoring module 108 is responsible for examining digital activities and communications to determine the likelihood that a security threat exists. For example, scoring module 108 can examine each incoming email to determine how its characteristics compare to past emails sent by the sender and/or received by the intended recipient. In various embodiments, scoring module 108 may determine whether characteristics such as timing, formatting, and location of origination (e.g., in terms of sender email address or geographical location) match a pattern of past emails that have been determined to be non-malicious. For example, scoring module 108 may determine that an email is likely to be malicious if the sender email address ("support-xyz@gmail.com") differs from an email address ("John.Doe@CompanyABC.com") that is known to be associated with the alleged sender ("John Doe"). As another example, scoring module 108 may determine that an account may have been compromised if the account performs a sign-in activity that is impossible or improbable given its most recent sign-in activity (e.g., the user logs in from Germany ten minutes after having logged in from California, or a user that typically accesses email from 9 am-5 pm on weekdays begins accessing email on weekends at 3 am).

Scoring module 108 can make use of heuristics, rules, neural networks, or other trained machine learning (ML) approaches such as decision trees (e.g., gradient-boosted decision trees), logistic regression, linear regression, or other appropriate techniques. A variety of packages can be used to generate the models, including PyTorch and TensorFlow. Scoring module 108 can output discrete outputs or continuous outputs, such as a probability metric (e.g., specifying the likelihood that an incoming email is malicious), a binary output (e.g., malicious or not malicious), or a sub-classification (e.g., specifying the type of malicious email). Further, scoring module 108 can rank or otherwise generate a prioritized list of the top features, facets, or combinations thereof that result in a particular message being identified as posing a security threat. In various embodiments, scoring module 108 executes a topic inference module. The topic inference module can be used to identify topics of digital communications. Assume, for example, that scoring module 108 is tasked with quantifying risk posed by an incoming email. In that situation, the topic inference module may identify one or more topics based on an analysis of the incoming email, its metadata, or information derived by the scoring module. These topics may be helpful in conveying the risk and relevance of the incoming email and for other purposes.

Reporting module 110 is responsible for reporting insights derived from outputs produced by scoring module 108 in various embodiments (e.g., as a notification summarizing types of threats discovered or other applicable output). For example, reporting module 110 can provide a summary of the threats discovered by scoring module 108 to an electronic device 114. Electronic device 114 may be managed by the employee associated with the account under examination, an individual associated with the enterprise (e.g., a member of the information technology (IT) department), or an individual associated with a security service, etc. Reporting module 110 can surface these insights in a human-readable format for display on an interface accessible via the electronic device 114. Such insights can be used to improve the overall security position of the enterprise, by providing specific, concrete reasons why particular communications are problematic to security personnel (or other appropriate individuals, such as end users).

Remediation module 116 can perform one or more remediation actions in response to scoring module 108 determining that an incoming email is likely representative of a threat. The types of remediation that can be taken can be based on the nature of the threat (e.g., its severity, the type of threat posed, the user(s) implicated in the threat, etc.), policies implemented by the enterprise, etc. Such policies can be predefined or dynamically generated based on inference, analysis, and/or the data obtained from enterprise network 112. Additionally or alternatively, remediation action(s) can be based on the outputs produced by the models employed by the various modules. Examples of remediation actions include transferring suspect emails to another folder such as a quarantine folder, revising the email (e.g., by modifying content included in the email such as an included link), generating an alert (e.g., to an administrator or to the user), etc.

Various embodiments of threat detection platform 100 include a training module 104 that operates to train the models employed by other modules. As an example, training module 104 can train the models applied by the scoring module 108 to the sign-in data, message data, email data, and/or mail filter data, etc., by feeding training data into those models. Example training data includes emails that have been labeled as malicious or non-malicious, policies related to attributes of emails (e.g., specifying that emails originating from certain domains should not be considered malicious), etc. The training data can be employee, group, enterprise, industry, or nationality specific so that the model(s) are able to perform personalized analysis. In some embodiments, the training data ingested by the model(s) includes emails that are known to be representative of malicious emails sent as part of an attack campaign. These emails may have been labeled as such during a training process, or these emails may have been labeled as such by other employees.

Training module 104 can implement a retraining pipeline (also referred to herein as a "pipeline") in order to protect against novel threats as further discussed below. At a high level, the pipeline corresponds to a series of steps that, when executed by the training module 104, cause the models employed by the scoring module 108 to be retrained. By consistently training models using up-to-date information, the threat detection platform 100 can protect against novel threats that would otherwise escape detection.

Unlike conventional email filtering services, a threat detection platform (e.g., threat detection platform 100) can be completely integrated within an enterprise environment. For example, threat detection platform 100 can receive input indicative of an approval by an individual (e.g., an administrator associated with the enterprise or an administrator of the email service employed by the enterprise) to access email, active directory, mail groups, identity security events, risk events, documents, etc. The approval can be given through an interface generated by the threat detection platform. For example, the individual can access the interface generated by the threat detection platform and then approve access to these resources as part of a registration process.

Upon receiving the input, the threat detection platform can establish a connection with storage medium(s) that include these resources via application programming interface(s) (APIs). For example, the threat detection platform may establish, via an API, a connection with a computer server managed by the enterprise or some other entity on behalf of the enterprise.

The threat detection platform can then download resources from the storage medium(s) to build an ML model that can be used to identify email-based security threats. The threat detection platform can build an ML model based on retrospective information in order to better identify security threats in real time as emails are received. For example, threat detection platform 100 can ingest incoming emails and/or outgoing emails corresponding to the last six months, and then build an ML model that understands the norms of communication with internal contacts (e.g., other employees) and/or external contacts (e.g., vendors) for the enterprise.

Such an approach allows the threat detection platform to employ an effective ML model nearly immediately upon receiving approval from the enterprise to deploy it. Most standard integration solutions, such as anti-spam filters, will only have access going forward in time (i.e., after receiving the approval). Here, however, threat detection platform 100 can employ a backward-looking approach to develop personalized ML model(s) that are effective immediately. Moreover, such an approach allows the threat detection platform to go through a repository of past emails to identify security threats residing in employees' inboxes.

The aforementioned API-based approach provides a consistent, standard way of looking at all email handled by an enterprise (or another entity, such as an email service, on behalf of the enterprise). This includes internal-to-internal email that is invisible from standard integration solutions. An SEG integration, for example, that occurs through the mail exchanger (MX) record will only be able to see incoming email arriving from an external source. The only way to make email arriving from an internal source visible to the SEG integration would be to externally reroute the email through the gateway.

Figure 1B:
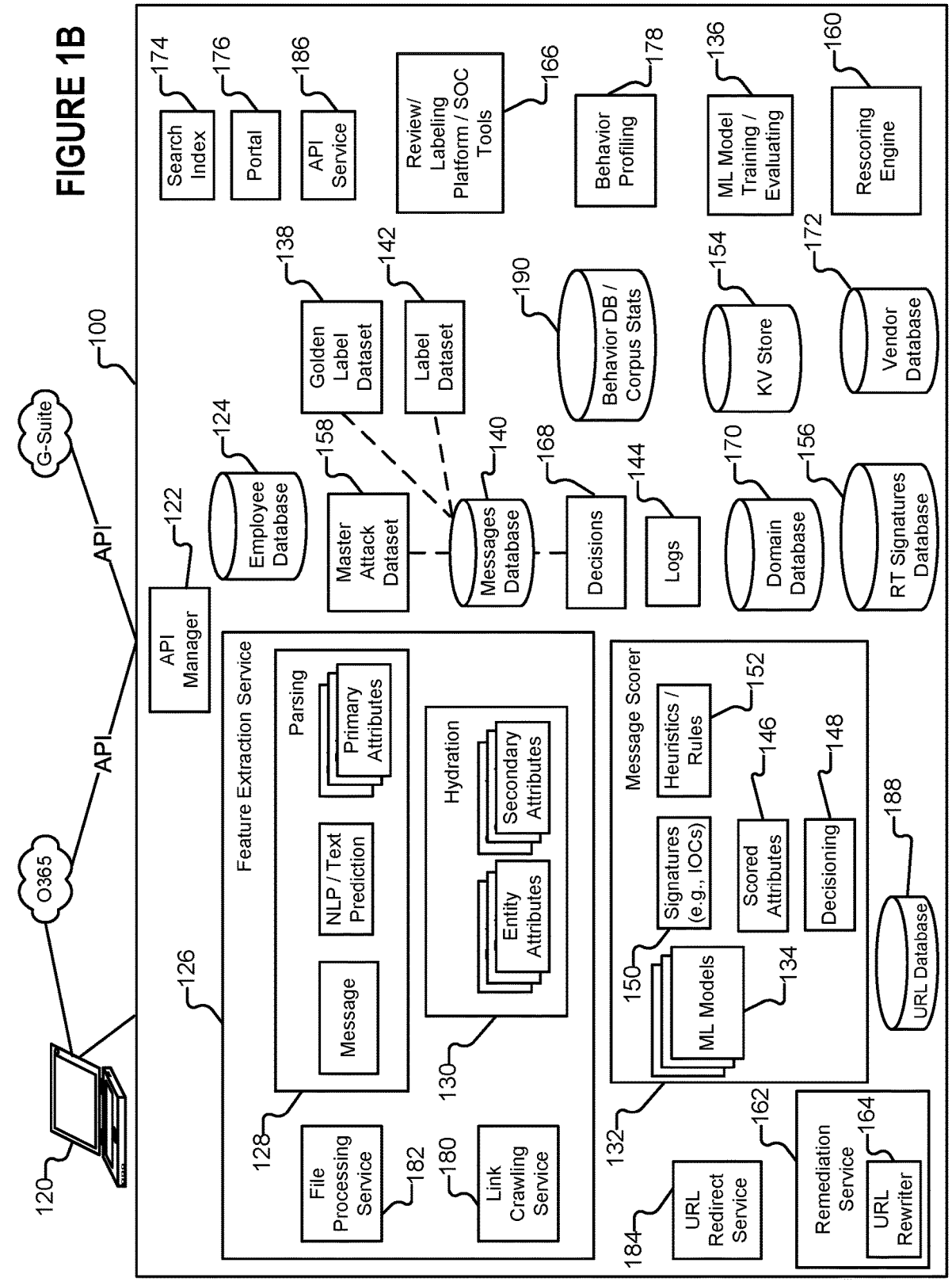
FIG. 1B depicts an example of a threat detection platform.

FIG. 1B depicts an example of a threat detection platform in accordance with various embodiments. In various embodiments, the infrastructure used by threat detection platform 100 is located across multiple data centers and makes use of various orchestration technologies (e.g., Amazon ECS or Kubernetes on Azure). As illustrated in FIG. 1B, an end user (e.g., "Alice," an employee of "ACME Corporation") accesses one or more enterprise accounts (e.g., on Microsoft Office 365) via a client device 120. Threat detection platform 100 programmatically monitors for the occurrence of events associated with such accounts (e.g., via one or more APIs). An example way for threat detection platform 100 to integrate with such APIs is via an API manager 122 that coordinates periodically/continuously requesting notifications for each employee of each tenant included in an employee database 124. API manager 122 can similarly facilitate communications between other providers (e.g., G-Suite, Slack, etc.) and threat detection platform 100.

Figure 1C:
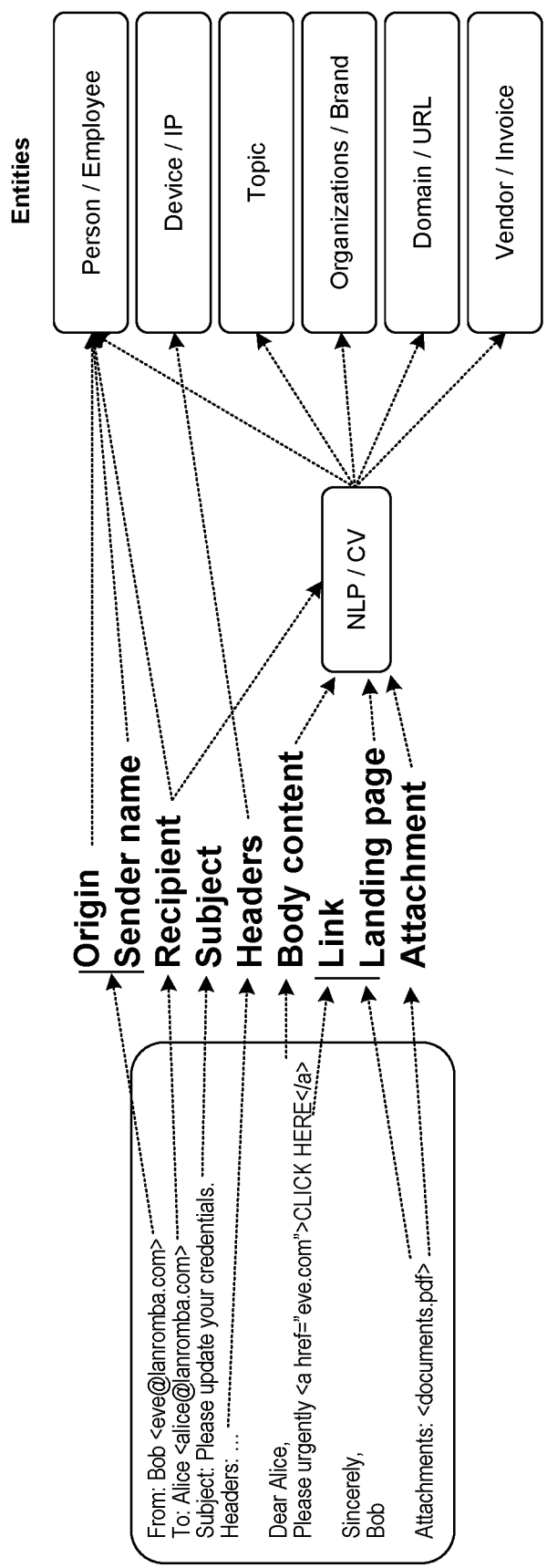
FIG. 1C depicts how information obtained from an email can be used to establish different features.

One example of an event is the receipt of an incoming email (e.g., from Bob to Alice). One task performed by threat detection platform 100 is an entity resolution procedure in order to identify the entities involved in the event. In some embodiments, the entity resolution procedure is a multi-step process. First, threat detection platform 100 will acquire information regarding the event. For example, if the event is the receipt of an incoming email, threat detection platform 100 can examine the incoming email to identify the origin, sender identity, sender email address, recipient identity, recipient email address, subject, header(s), body content, etc. Moreover, threat detection platform 100 can determine whether the incoming email includes any links, attachments, etc. Second, threat detection platform 100 will resolve the entities involved in the event by examining the acquired information. FIG. 1C depicts how information obtained from an email can be used to establish different entities (also referred to as "features" or "attributes" of the incoming email). Some information may correspond directly to an entity. In the example of FIG. 1C, for example, the identity of the sender (or purported sender) may be established based on the origin or sender name. Other information may correspond indirectly to an entity. In the example of FIG. 1C, for example, the identity of the sender (or purported sender) may be established by applying a natural language processing (NLP) algorithm and/or computer vision (CV) algorithm to the subject, body content, etc. Entities may be established based on the incoming email, information derived from the incoming email, and/or metadata accompanying the incoming email.

In some embodiments, threat detection platform 100 will augment the acquired information with human-curated content. For example, feature(s) of an entity may be extracted from human-curated datasets of well-known brands, domains, etc. These human-curated datasets can be used to augment information gleaned from the enterprise's own datasets. Additionally or alternatively, humans can be responsible for labeling entities in some situations. For example, a human may be responsible for labeling landing pages and/or Uniform Resource Locators (URLs) of links found in incoming emails. Human involvement may be useful when quality control is a priority, when comprehensive labeling of evaluation metrics is desired, etc. For example, a human may actively select which data/entities should be used for training the ML model(s) used by the threat detection platform.

Returning to FIG. 1B, when a new message arrives, feature extraction service 126 processes it. One way of implementing feature extraction is as a set of Python services that receive messages via a load balancer and perform applicable tasks. A notification received from Office 365 includes information about the message being delivered. The information included with the notification can be used to perform top level filtering, which can help reduce infrastructure costs. If sufficient information is provided that indicates that the message is safe, further processing can be omitted. Otherwise, the message content can be downloaded into threat detection platform 100 for parsing (128). For performance reasons, at this stage, metadata about any attachments (e.g., file size, file type, file name) can also be obtained for analysis (without needing to download the attachment itself at this point). Feature extraction service 126 creates a message object and creates primary attributes. It calls a prediction service using the message body text. The prediction service provides information about the content (e.g., whether it contains "urgent" vocabulary words, whether it is a solicitation, key topics in the message, etc.). An example way of implementing the prediction service is as a python service (that can make use of one or more heuristics/models/etc. in evaluating message content). Example techniques for determining topics are described below.

Feature extraction service 126 optionally makes use of a link crawling service 180 and a file processing service 182 (e.g., based on whether a given message includes links or attachments) to gain insight into links and attachments, respectively. In an example embodiment, the link crawling service is a python process that, given a link, follows the link (and traverses any redirects) to determine the actual destination of the target link. Such redirects might be due to legitimate security systems (e.g., Microsoft Safelinks URLs) or attempts to maliciously conceal a destination from an end user (or other reasons, e.g., load balancing, advertisement tracking, etc.). Domain information about the actual destination can also be obtained (e.g., by querying domain database 170). Link crawling service 180 can also crawl the landing page of the target link, e.g., to evaluate whether other links are present on the page, evaluate whether the landing page is likely to be a phishing site (e.g., based on page content purporting to belong to a Microsoft login page, a bank login page, etc., but for which the domain does not match the content), etc. If link crawling service 180 (or another appropriate component of threat detection platform 100, such as one or more models 134) determines that a link is malicious, that information can be used to flag the message containing the link as malicious. If link crawling service 180 (or another appropriate component of threat detection platform 100) determines that a link is suspicious, an entry can be added into URL database 188 indicating that a particular message includes a particular suspicious URL that should be rewritten by remediation service 162 (via URL rewriter 164). An example way of implementing URL database 188 is using Postgres. An example schema for storing information in URL database 188 is: messageID, recipientID, URL.

File processing service 182 (which can also be implemented in python), given an attachment (e.g., downloaded from Office 365 or G-Suite), can perform a variety of tasks. As an example, if the attachment is a PDF, file processing service 182 can parse the PDF and look for links (and, as applicable, provide those links to link crawling service 180 for examination). If the attachment is a Word document, file processing service 182 can determine whether any macros are present, and if so, whether they make service calls outside. File processing service 182 can also take more resource intensive actions, such as opening attachments in sandboxes and determining, for example, whether attempts are made to modify registry entries. Information extracted from payloads (whether attachments or links) can be used as primary attributes (e.g., "includes a link to a GoogleDoc," "has an attachment of a PDF over 125 k in size," or "has an attachment that is an Excel document with a macro"). Derived attributes are also referred to herein as secondary attributes. A file processor is a computer program that is designed to systematically browse documents attached to communications to establish, infer, or otherwise obtain information regarding the content of those documents. For example, threat detection platform 100 can employ a file processor to establish whether a document attached to a communication includes any links or forms. Any such attachments can be processed by file processing service 182 that can perform static analysis on a variety of different types of files (e.g., to further build out a set of features associated with the message).

A variety of policies can be used by threat detection platform 100 in determining whether to perform additional (supplemental) file processing. Generally (e.g., to minimize resource usage), a goal is to only scan files (or portions of files) that could pose security risks. To that end, limits can be placed on file processing at a high level (e.g., for a maximum file size and maximum number of files processed). For a given file type (e.g., PDF, HTML, DOC, XLS, etc.), one approach is to process all such attachments that pass a file size filter criteria. For images (and/or for images included within other filetypes, which can be used, for example, in phishing related attacks), optical character recognition (OCR) can be used. Unfortunately, performing OCR is resource intensive. Policies can be used to specify limits on how much processing is performed (e.g., limiting OCR or other supplemental analysis based on message body length, file size, number of attachments included in a message, etc.). As another example, only the first sheet of a multi-page spreadsheet could be subjected to analysis. Further, such policies can be flexible, e.g., adjusting up or down based on attributes of the message (e.g., with a more suspicious message having a higher size threshold for analysis than a less suspicious message).

A link crawler (also referred to as a "Web crawler") is a computer program that is designed to systematically browse the Internet to establish, infer, or otherwise obtain information about the websites to which links lead. Assume, for example, that threat detection platform 100 discovers that a link is included in either the body or payload of a communication. In such a scenario, threat detection platform 100 can employ a link crawler (provided by link crawling service 180) to establish the landing website to which the link ultimately leads, whether there are any intermediary websites through which the link crawler is routed before accessing the landing website, etc. Determinations can then be made, for example, about whether the landing page (or a subsequent page) inappropriately solicits credentials (e.g., using topic analysis or other approaches), etc., and any such issues can be imputed to the message (e.g., to flag the message as related to credential phishing). While the attachment and link crawlers perform similar tasks, those normally correspond to separate computer programs that can be individually executed by the threat detection platform.

This approach is beneficial in several respects. As an example, this approach to recording signatures of payloads deemed malicious allows threat detection platform 100 to readily detect malicious payloads through comparison to the signature store. The term "signature" may refer to the payload itself, malicious content (e.g., malware) included in the payload, or information that is extracted or derived from the payload. This approach allows malicious payloads to be discovered more quickly because threat detection platform 100 can autonomously generate signatures without human confirmation. Moreover, these signatures can be shared across a broader community. For example, the signature store may be representative of a federated database that is shared across multiple enterprises. In such a scenario, threat detection platform 100 can generate a signature for a communication directed to an employee of a first enterprise and then use the signature to identify malicious payloads amongst communications directed to a second enterprise.

A variety of policies can be used by threat detection platform 100 in determining whether to crawl links. The following are examples:

Follow the first link in a message if that link has not been seen before and the message is from a previously unseen sender. (Crawling only the first link, or first few links saves resources over crawling all links.)

Crawl young domains (e.g., those registered less than 3 months ago).

Follow links in attachments.

Follow links that are in a set list (e.g., file sharing domains, redirect domains).

Do *not* crawl links that have sensitive phrases such as "unsubscribe."

Do *not* crawl links that have anchor text that may be stateful.

Each of the policies can be applied with different link crawlers that crawl a page in different ways (e.g., HTTP.HEAD, HTTP.GET, as well as a screen shot service that renders a page in a headless browser and screenshots the page). In some embodiments, each policy defines which crawler(s) to apply and emits an allow, deny, or no decision. A link crawler can be configured to only crawl a particular URL if any applicable policies include at least one "allow" and no "denies." In general, this approach favors crawling links that could be harmful (and thus aspects such as link rarity, domain location, domain age, and anchor text can all be factors), and not crawling links that could be stateful (e.g., inadvertently triggering automatic "unsubscribe" actions by crawling).

As an example, suppose threat detection platform 100 is processing a message that includes three links (A, B, C). Two policies (X, Y) are applicable to the links—specifically, for link crawler HTTP.GET, crawling link A is allowed by policy X, crawling link B is allowed by policy X, but crawling link B is denied by policy Y. Crawling link C is not actioned by either policy. In this scenario, the link crawler would crawl as follows (based on the policies):

Link A: [Allow, No action]→crawl
Link B: [Allow, Deny]→do not crawl
Link C: [No action, no action]→do not crawl After parsing, feature extraction service 126 performs hydration (130), by looking up information in various databases (e.g., employee database 124 or domain database 170) to determine entity attributes and determine secondary attributes (e.g., cross products such as "is this an unknown sender for this recipient" or "how many times has this recipient received a message from this sender").

Behavior database 190 is an aggregates database that includes various information for predefined aggregate keys. Examples of predefined cross products (or singular keys) include: information about a sender across a company ID, information about a sender across an IP address, etc., and counts pivoted by good and bad messages. So, for a given sender, information such as "how many times have we seen a message from this sender that was determined to be malicious" can readily be determined during hydration (and also used for other purposes, such as model training and evaluation). An example way of implementing behavior database 190 is to download information about messages on a daily basis, and then have a behavior profiling module 178 look back over a 30-day period to generate the aggregate data (e.g., as a batch pipeline that runs on top of Spark). Once the aggregate information is collected, a flat S3 file structure can be generated which has the various aggregates as key value pairs. The key value pairs can be loaded into memory for realtime lookup, e.g., using RocksDB.

RocksDB can also be used for employee database 124 and domain database 170. One way of populating employee database 124 is for threat detection platform 100 to make API calls (e.g., to Office 365) to obtain directory and other information (e.g., user name, display name, job title, department, etc.). Additional information can also be inferred from the obtained information (e.g., whether the employee is a VIP) or, as needed, manually specified (e.g., with an enterprise providing a list of employees who should be flagged as VIP). Behavioral information about a given user (e.g., "Alice typically writes emails in HTML" instead of plaintext or "Alice typically signs messages with 'best regards'" instead of "cheers") can be stored in behavior database 190.

Domain database 170 stores various information about domains (e.g., obtainable through one or more third party services and/or by performing domain-related lookups). Examples include information such as the age of the domain, the identity of the registrar, a cache of whois information, last time changes were made to the domain, the associated top level domain (e.g., .com vs. .cn), etc. Domain database 170 can be manifested using RocksDB and also as an online Postgres table which can be queried in realtime and updated when it is determined (e.g., by message scorer 132) that information is missing.

Each message processed by threat detection platform 100 has a unique identifier assigned to it. The identifier gets persisted into messages database 140 and various information about the message, including metadata (such as the subject, from address, to address, and other details) and actions taken with the message (e.g., tracking whether it is moved from one folder to another) is stored in a variety of tables. One example way of implementing messages database 140 is as a MySQL database. Most entries in the messages database will have an entry into a key value store 154 (implemented, for example, as a Postgres database). Various datasets can be extracted from messages database 140 (e.g., as a view on top of messages database 140 and/or as a batch extraction that can be joined with other datasets). One example is master attack dataset 158. Another example is a set of messages which received erroneous verdicts from threat detection platform 100 (e.g., false negatives or false positives reported by end users, enterprises, etc.). Another example is a rescoring dataset, which can be used to determine (e.g., by rescoring engine 160) how scores for particular messages change based on, for example, updates made to given models and manifested in master attack dataset 158.

Message scorer 132 (which can also be implemented as a set of Python services) makes use of a variety of ML models (134) created by ML model training/evaluating module 136. Some of the messages with entries in messages database 140 are hand labeled by humans (or have had their automatically generated labels confirmed by humans). Threat detection platform 100 includes a golden label dataset 138 which is a batch dataset of messages which also have all of their corresponding features (e.g., message content) extracted and stored. This is in contrast to other messages represented in messages database 140 whose complete set of features are not extracted/stored (e.g., for efficiency and/or privacy reasons which would disfavor downloading and persisting all content of all messages—particularly for benign message content). The golden label dataset can be used as true positive samples for model training purposes (e.g., to create new models, update models, and evaluate the efficacy of models at detecting various types of messages). One way of generating the golden label dataset is by joining information in messages database 140 with label dataset 142 and logs 144.

In various embodiments, when message scorer 132 determines a verdict for a message, the verdict is written to an S3 firehose, which is manifested as a set of S3 logs. The S3 logs are written out on an hourly cadence and rolled up into daily message scorer logs. Logs 144 represent these logs, optimized for querying in a variety of ways (e.g., including using Apache Parquet, Amazon Athena, etc.).

One way of providing ML models 134 to message scorer 132 is by persisting them to S3 files which are loaded via an infrastructure layer process which allows files to be loaded into memory. The models are serialized using Apache Thrift. Each model has its own scored attribute 146 that indicates, for a given message, a score determined by a given model. Decisioning layer 148 can consider both individual scored attributes as well as an ensemble of scored attributes when evaluating a message (with the ensemble model score being another example of a scored attribute). As an example, one scored attribute is "suspicious link" (does a message have a suspicious link or not) and another scored attribute is "spam" (is a message spam or not). Decisioning layer 148 can form a verdict (e.g., "good," "suspicious," or "bad") based on a combination of those two scored attributes (along with others, as applicable). Or, if a "business email compromise" model reports a sufficiently high score, the decisioning layer can label the message purely based on that single model's score. As another example, one ML model can provide a verdict of whether a given message is "business critical" or not (which might be omitted from the ensemble). Further, scored attributes can also be provided by applying various signatures 150 and/or heuristics/rules 152 to messages. An example of a rule is: "a message having an unknown sender" and also "includes a link to a file hosting server" (e.g., Google Drive) should be flagged. One way to implement such rules is using a domain specific language and storing them in a .JSON file in S3, which can then be loaded by message scorer 132. For efficiency, if any of the scored attributes (e.g., whether obtained from ML models 134, signatures 150, or heuristics/rules 152) indicate that a particular message is bad (e.g., above a particular threshold), decisioning layer 148 can terminate additional evaluation of the message. For example, if a message is flagged by a signature, evaluation of the message by one or more models 134 can be cancelled (or not initiated, etc.). One way to implement decisioning layer 148 is in Python. In some embodiments, threat detection platform 100 maintains separate signature stores for different types of entities. As an example, a first signature store for attachments can be maintained, along with a second signature store for links.

In some embodiments, the various message attributes (e.g., primary attributes, entity attributes, secondary attributes, and/or scored attributes) are represented as Thrift objects. This allows for them to be stored as a big blob in key value store 154, and is also useful in debugging (e.g., if a message is determined to have had an incorrect verdict, an examination can be made as to how each of the various models performed).

Realtime signatures database 156 is based on a realtime pipeline that works off of Kafka and feeds into a Redis store. During an attack, initially only some messages may be identified as being harmful (e.g., those with particular language or particular attachments). However, once a threshold number of messages have been identified as bad (in realtime), e.g., a particular sender is actively perpetrating an attack, message scorer 132 can use information from realtime signatures database 156 to automatically block any messages from that sender (even if individual messages may not otherwise be flagged, e.g., by models 134). As an example, if the same sender using the same IP address has had a threshold number of messages flagged as bad within a particular time frame, all subsequent messages from that sender and address can be automatically blocked by the inclusion of particular attributes (e.g., sender identity and IP address) inserted as a signature into realtime signatures database 156.

Once message scorer 132 arrives at a particular verdict for a message (e.g., "good," "bad," or "suspicious"), remediation service 162 can take an appropriate action (e.g., based on a configuration provided by an enterprise). For example, ACME could configure a preference that threat detection platform 100 move messages determined to be "bad" to a quarantine folder or a hidden folder, but move messages determined to be "suspicious" to a Junk folder. In addition to forming verdicts for entire messages, message scorer 132 can also determine that certain parts of a message are problematic, and instruct remediation service 162 to take more granular actions as well. As one example, message scorer 132 may determine that a link included in a message is suspicious, but the message itself is not otherwise problematic. Message scorer 132 can add an entry for the message (enumerating any suspicious URLs) in URL database 188. When message scorer 132 instructs remediation service 162 that the message needs remediation, one task remediation service 162 will perform is checking URL database 188 for the message ID (e.g., based on a flag of "check URL database 188" included in the instruction from message scorer 132 to remediation service 162), and then rewriting any noted URLs (via URL rewriter 164) but otherwise leave the message alone. As another example, message scorer 132 could have a low confidence in its verdict and add the message to a human review queue (e.g., managed by platform 166) as a false positive mitigation. In some embodiments, decisions regarding particular messages are stored in decisions table 168 (stored, e.g., in messages database 140). In some embodiments, as applicable, only decisions for messages ultimately deemed to be bad, suspicious, or for sampling purposes are stored in messages database 140 (in decisions table 168). In some embodiments, remediation service 162 uses asynchronous workers (e.g., based on Celery) to take appropriate actions as needed based on the contents of decisions table 168.

Another component of threat detection platform 100 is vendor database 172. This database is built from known lists of common vendors (e.g., payroll services, business supply providers, shipping companies, etc.) and also by evaluating emails (e.g., to determine which enterprises make use of which vendors). Behavioral information about the vendors (e.g., whether they have been compromised, the frequency with which they send messages, etc.) is stored in behavior database 190.

Threat detection platform 100 also includes a search index 174 which can be used as a real time lookup index on all messages. In some embodiments, search index 174 is built on top of Elasticsearch. As messages are scored (e.g., by message scorer 132), they are indexed (e.g., via Kafka) into search index 174. The search index can be used for a variety of purposes, one of which is determining engagements. For example, if a message is determined to be malicious, a determination can be made as to whether any users responded to the message (e.g., replied to the message) so that remedial actions can be taken. As another example, if a report of a false negative is received (e.g., by a user forwarding a suspicious message to a reporting email such as abuse@abnormalsecurity.com or abuse@acmecorporation.com), the search index can be used to identify the message's unique identifier within threat detection platform 100. Search index 174 is also used by portal 176 to deliver reporting and other information in a web interface (e.g., to users such as Alice, administrators, etc.). In some embodiments, portal 176 also makes available administrative tools to enterprises (as a frontend to SOC tools platform 166), e.g., allowing them to search for a particular message or set of messages and remove them from user mailboxes. In addition to accessing reports and other information via portal 176, enterprises can also access information on threat detection platform 100 via an API service 186 (e.g., after being issued a token). An example way of implementing API service 186 is using a Django-based API service, and an example way of implementing portal 176 is using React and JavaScript.

Also included in threat detection platform 100 is a URL redirect service 184. One way of implementing URL redirect service 184 is as a Django application. As mentioned above, one task that can be performed by remediation service 162 is (as applicable) the rewriting of suspicious URLs (via URL rewriter 164). Both URL rewriter 164 and URL redirect service 184 can make use of a URL wrapper library (e.g., authored in python) to wrap and unwrap (rewrite and un-rewrite) URLs, sign/verify that wrapped (rewritten) URLs were generated by threat detection platform 100, and support user identifier query parameters for click tracking purposes. When a user opens a message that includes such a rewritten URL and clicks on the rewritten link, they will be directed to threat detection platform 100 (or another appropriate location that notifies threat detection platform 100 that the rewritten link has been clicked on). URL redirect service 184 provides an appropriate landing page for the user which can alert the user that the URL has been rewritten, provide reasons why the URL was rewritten (e.g., alerting the user to the reason(s) the URL was deemed suspicious), and ask the user to confirm whether they wish to proceed (to the original destination). Tracking information can be obtained (e.g., noting whether the user landed on the landing page, noting whether the user opted to click through to the original destination, etc.).

II. Techniques for Deriving Topics for Messages

Threat detection platform 100 can characterize digital communications along several dimensions. These dimensions are also referred to herein as "facets." Facets are useful in several respects. As a first example, the facets can be used by an individual to resolve the types of attacks employed against an enterprise, as well as to create datasets that are useful for training, introspection, etc. The individual may be a member of the IT department of the enterprise, or the individual may be employed by a security service responsible for monitoring the security of the enterprise. As a second example, facets can be used as a way to divide data internally to allow teams to work on specific subsections of email attacks. These teams can then improve detection of the email attacks by training models on subset data and improve scoring module 108. As a third example, the facets can be provided as input to security operations center (SOC) tools that may be used to filter data, generate reports, etc. An incoming email may be associated with one or more of the following example facets:

Attack Type: This facet indicates whether the incoming email is indicative of business email compromise (BEC), phishing, spoofing, spam, etc. It is derived based on combinations of the following five facets.

Attack Strategy: This facet indicates whether the incoming email qualifies as name impersonation, internal account compromise, external account compromise, a spoofed message, a message originating from an unknown sender, etc.

Impersonated Party: This facet indicates who, if anyone, the incoming email intended to impersonate. Examples include very important persons (VIPs) such as c-suite executives, assistants, employees, contractors, partners, vendors, internal automated systems, external automated systems, or no one in particular.

Attacked Party: This facet indicates who was the target of the attack carried out by the incoming email. Examples include VIPs, assistants, employees, and external recipients such as vendors, contractors, and the like. In some embodiments, this facet may further identify the group or department under attack (e.g., the accounting department, human resources department, etc.).

Attack Goal: This facet indicates the goal of the attack carried out by the incoming email. Examples include invoice fraud, payment fraud, credential theft, ransom, malware, gift card fraud, and the like.

Attack Vector: This facet indicates how the attack is actually carried out, for example, by specifying whether the risk is posed by text, links, or attachments included in the incoming email.

These above example facets can be used as the "building blocks" for describing the nature of communication-based attacks, for example, to enterprises. Together, these facets can be used to characterize an attack along predetermined dimensions. For example, incoming emails can be characterized using one, some, or all of the above facets. A layer of configuration can be used over facets to define, establish, or otherwise determine the nature of an attack. For example, if threat detection platform 100 determines that, for an incoming email, (i) the attack goal is invoice fraud and (ii) the impersonated party is a known partner, then the threat detection platform can define the incoming email as an instance of "external invoice fraud." Consequently, these facets can flow into other functionality provided by threat detection platform 100 such as: (i) internal metrics indicating how the threat detection platform is managing different attack types, (ii) reporting to enterprises, and (iii) filtering for different attack types.

The above facets can be augmented to more completely/accurately represent the nature of a malicious communication. In particular, information regarding the topics mentioned in such communications can be used. Assume, for example, that several incoming emails related to different merger and acquisition scenarios are determined to be representative of phishing attacks. While each of the incoming emails have the same attack goal—that is, scamming the recipients—each incoming email is rather specific in its content. In such a situation, it would be useful to provide information about the actual content of the incoming emails to those individuals responsible for managing the threat posed by those incoming emails. Furthermore, some scenarios call for a more fluid approach to characterizing threats that allows threat detection platform 100 to more quickly surface new attack types. Historically, it has been difficult to measure, characterize, and report new attack types until sufficient training data regarding those new attack types has been provided to the appropriate models. Note that characterizing threats along a greater number of dimensions also lessens the likelihood of different communications being characterized as similar or identical. As an example, an email inquiring about invoices and an email requesting a quote may both be classified as instances of payment fraud if those emails are characterized along a limited number of dimensions. While those emails may have the same attack goal, the content of those messages is different (and that may be useful information in determining how to discover or remediate future instances of similar emails). An example of two messages sharing the same topic but two different attack goals is a shared topic of "invoice," with the first message having an attack goal of credential phishing ("click here to sign into your account and make a payment or update your payment information") and the second message having an attack goal of payment fraud ("your account is overdue, please send a check to pay your outstanding balance"). An example of two messages sharing the same attack goal but two different topics is a shared attack goal of "credential phishing," with the first message having a topic of "debit account detail updates" ("set up your new direct debit by clicking here") and the second message having a topic of "COVID-19" ("due to COVID-19 we have a new policy, click here to access our client portal and find out more").

Described herein are techniques for characterizing digital communications along a type of dimension referred to as "topics." Upon receiving a digital communication, threat detection platform 100 can apply one or more models in order to establish one or more topics of the digital communication. The term "topic" refers to a subject that is mentioned (either directly or indirectly) in content of the digital communication. As with the facets mentioned above, a given digital communication can be associated with multiple topics. Various combinations of topics, if present in a given message, can also be assigned/associated with more human meaningful descriptions (e.g., that can then be used to describe the message content instead of/in addition to each of the individual topics).

Topics can be derived by threat detection platform 100 regardless of whether the digital communication is deemed to be representative of an attack or not. In the event that the threat detection platform determines a digital communication is representative of an attack, the threat detection platform can generate and then surface a report that specifies an attack goal and topic(s) of the digital communication. Together, these pieces of information allow greater insight to be gained by the individual responsible for reviewing the report into the actual threat posed by the digital communication.

Figure 2A:
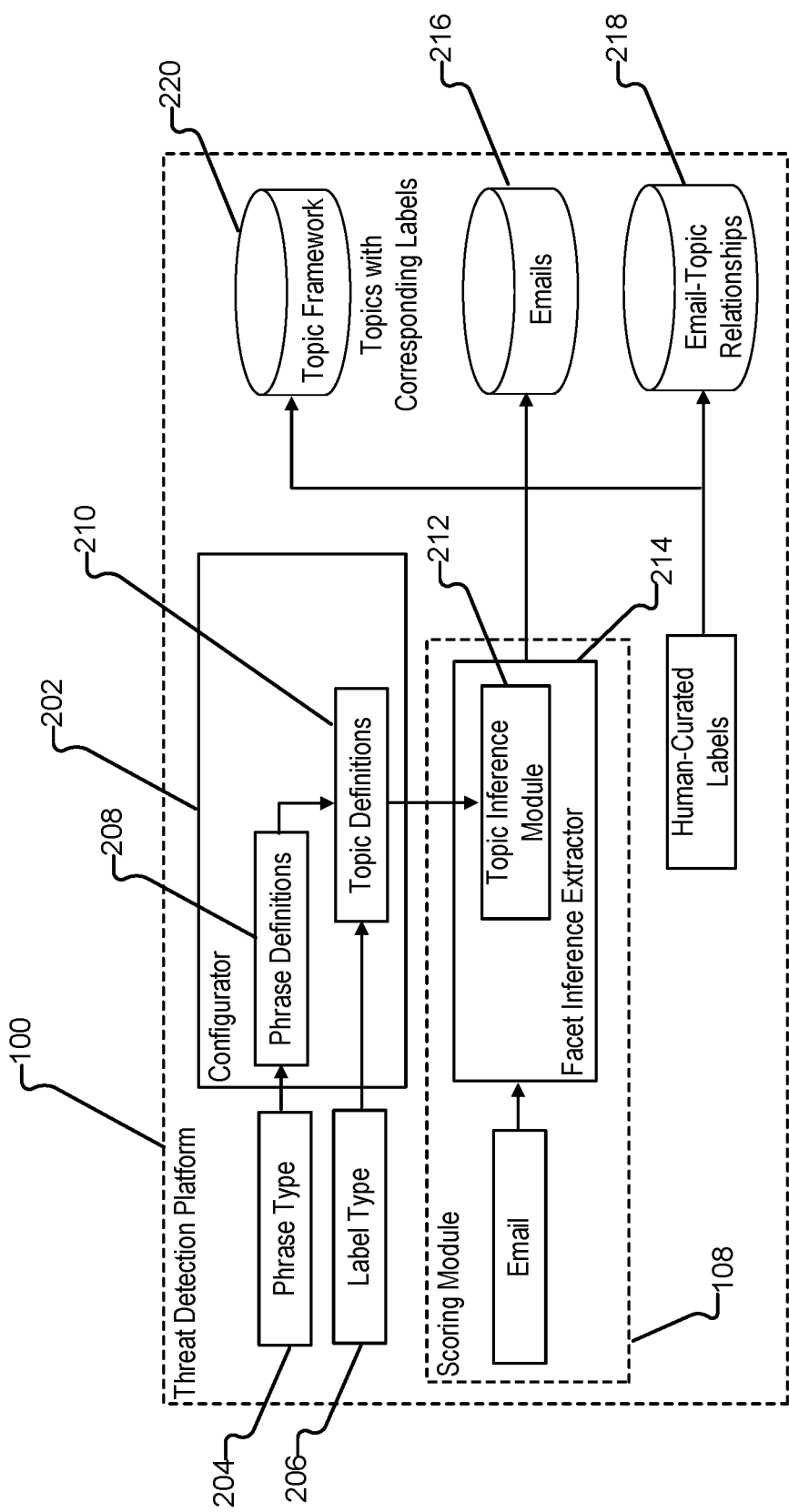
FIG. 2A illustrates an example of how topics of a digital communication can be discovered.

FIG. 2A illustrates an example of how topics of a digital communication can be discovered. Topics are designed to be fluid, and thus can be as expansive or specific as desired. Some enterprises may wish for more detailed information regarding the subjects discussed in malicious emails (e.g., "mergers and acquisitions" vs. "IPOs" vs. "bankruptcy"), in which case more topics may be available for classifying emails. Other enterprises may wish for less detailed information regarding the subjects discussed in malicious emails (e.g., "financial"), in which case fewer topics may be available for classifying emails. Further, enterprises can customize topics of particular relevance/importance to them (e.g., an engineering firm defining a set of topics around research and development vs. a shipping company defining a set of topics around transit, supply chains, etc.), instead of/in addition to topics of broad applicability (e.g., invoices). As applicable, enterprises can provide examples of labeled messages to threat detection platform 100 so that custom models/rules for identifying topics in accordance with those labels can be built/deployed. If needed, a larger data set can be constructed, e.g., using techniques such as nearest neighbor, text augmentation, etc. In various embodiments, topics are hierarchical/multi-class, e.g., with several different sub-topics/related topics grouped together (e.g., using multinomial prediction).

In an example implementation, a topic is: (i) a potential subject of text included in an email, (ii) inferable by a human and machine, and (iii) independent of malicious intent. Accordingly, topics can be defined for all emails examined by the threat detection platform, irrespective of whether those emails are representative of attacks. Note that, in some embodiments, topics are defined with sufficient granularity that a given email is labeled as pertaining to multiple topics. This can be done to increase the likelihood that different emails with similar attack goals, such as those mentioned above, are distinguishable from one another.

To create a new topic, the topic is added to configurator 202 by an administrator (e.g., of threat detection platform 100). As shown in FIG. 2A, phrase types (204) and label types (206) may initially be provided to configurator 202 as input. The phrase types can be used by configurator 202 to generate phrase definitions (208), and the label types and phrase definitions can be used by configurator 202 to generate topic definitions (210), mapping topics to different phrase definitions and locations. Topics defined within configurator 202 can then be persisted through to other components and/or layers of threat detection platform 100. As an example, topic definitions 210 can be provided to a topic inference module 212 of a facet inference extractor 214. As shown in FIG. 2A, in some embodiments, facet inference extractor 214 is executed by a real-time scoring module (e.g., an embodiment of scoring module 108) that is configured to quantify the risk posed by incoming emails as discussed above. Topic inference module 212 is configured to infer, based on outputs produced by scoring module 108, one or more appropriate topics for the email. In some embodiments, a given email will have two sets of topics associated with it by threat detection platform 100. The first set of topics corresponds to topics inferred by threat detection platform 100. The second set of topics corresponds to topics explicitly defined or curated by a user of the threat detection platform (e.g., an analyst or administrator of threat detection platform 100, or a representative of an enterprise).

Applicable topics are associated with a given email, e.g., in an appropriate storage location. For example, topic inference module 212 can append labels that are representative of the topics to the email itself, e.g., by using an API provided by an email provider to edit the message (e.g., stored within email store 216) to include the topics (e.g., as one or more X-headers or other metadata). As another example, topic inference module 212 can populate a data structure with information regarding the labels. This data structure can be stored in a database in which email-topic relationships are formalized (e.g., database 218).

In an example of how threat detection platform 100 can be used, suppose a particular type of attack makes use of a malicious email that discusses a merger and acquisition scenario. Configurator 202 can be used to create an appropriate topic so that similar emails can be identified in the future. In particular, configurator 202 creates an appropriate label (e.g., "merger & acquisition" or "M&A") for the topic and then associates with that label, a set of phrases (e.g., "merger and acquisition," "merger/acquisition," "tender offer," "purchase of assets," etc.) that can be used (e.g., as filters) to identify messages to be associated with the label. The topic definition (comprising a label and corresponding phrases) can then be provided to other portions of threat detection platform 100, such as a data object usable by topic inference module 212 (and, e.g., stored in topic framework database 220).

New topics can be automatically learned by/added to threat detection platform 100 based on an analysis of incoming emails and/or outgoing emails. Additionally or alternatively, individuals (e.g., an administrator of threat detection platform 100) can be permitted to manually create topics (e.g., by accessing an administrative console provided by threat detection platform 100). Any human-labeled topics can be altered or deleted by threat detection platform 100 as applicable, based on, for example, whether the manually added topics are actually present in emails (i.e., do any messages match the topic), whether those manually added topics align or overlap with existing topics, etc.

The attack goal facet attempts to characterize an end goal of a given email. As such, the attack goal facet has malicious intent associated with it. Conversely, the topic facet refers to the subjects that are raised in, or related to, the content of an email or other communication (without regard to maliciousness). Table I includes examples of emails with corresponding topics and attack goals.

TABLE I

Examples of emails and corresponding topics and attack goals.

| Email Description | Possible Topic | Possible Attack Goal |
|---|---|---|
| Credential theft message in the context of file sharing a link to an invoice | File Sharing, Invoice | Credential Theft |
| Fraud message in the context of external invoice | Bank Account Information, Call to Action/Engagement, Invoice Payment | Invoice Fraud |
| Merger and Acquisition Scam | Mergers and Acquisition | Scam |
| Cryptocurrency Engage Message | Call to Action/Engagement, Cryptocurrency | Engage |
| Reconnaissance Message | None | Spam |
| Payment Fraud Message that uses COVID-19 as Pretense | COVID-19, Request for Quote (RFQ) | Payment Fraud |

As can be seen in Table I, it is possible for topics and attack goals to overlap in some instances. For each email, threat detection platform 100 may introduce a many-to-many relationship between the email and the topic labels in which a topic can be associated with more than one email and an email can be associated with more than one topic. Such an approach allows the threat detection platform to support several possible queries, including:

The ability to filter emails by topic or combination of topics;

The ability to count the number of emails associated with a given topic; and

The ability to modify the topics associated with an email, as well as create labels for those topics.

Tables II-IV illustrate various examples of schemas that can be used by embodiments of threat detection platform 100 to associate emails with topics (e.g., in database 218).

TABLE II

Example schema for topics.

| Column Name | Data Type | Column Metadata |
|---|---|---|
| Topic_ID | Integer | Primary Key |
| Topic_Name | str/varchar(255) | Indexed, unique, fixed |
| Date_Created | Date, Time | |
| Topic_Display_Name | str/varchar(255) | How topic is shown to user |

TABLE III

Example schema for storing human-confirmed topics.

| Column Name | Data Type | Column Metadata |
|---|---|---|
| Topic_ID | Integer | Primary Key |
| Message_ID | Integer | Foreign Key |
| Human_Labeled | Boolean | |
| Date_Created | Date, Time | |

TABLE IV

Example schema for storing inferences for measurement.

| Column Name | Data Type | Column Metadata |
|---|---|---|
| Topic_ID | Integer | Primary Key |
| Message_ID | Integer | Foreign Key |
| Date_Created | Date, Time | |

In some embodiments, threat detection platform 100 uses a domain specific language (DSL) to match against messages and their attributes. The DSL allows for the dynamic addition of different rules to assign messages topics, based on static features of the message (e.g., does it contain particular pre-defined phrases) or more dynamic features (e.g., using one or more models to score a message and derive topic information from the score(s)). One benefit of the lightweight nature of topic specification is that time-sensitive topics can be readily added to threat detection platform 100. As an example, attackers often make use of current/world events to lend legitimacy to their attacks (e.g., an attacker referencing a recent fire or other natural disaster as a reason that an email recipient should take an action, such as logging into a payment system). Such topics can efficiently be added to threat detection platform 100 to help identify attacks.

Below are examples of topics and corresponding DSL to identify when a given message matches a topic:

Example Topic: Cryptocurrency

```
"topic_cryptocurrency": [{
"sec:HAS_BITCOIN_ADDRESS": true
},
{"sec:HAS_BTC_RANSOMWARE_LINGO":true},
{"feat_attr:CRYPTO_TOPIC_MODEL/gt":0.7}
]
```

The above DSL states that a message can be classified as having a "cryptocurrency" topic if any of the following is true: (1) it includes a bitcoin address, (2) it uses commonly found bitcoin ransomware expressions, or (3) a trained cryptocurrency topic model scores the content higher than 0.7.

Example Topic: Document Sharing

```
"topic_document_sharing": [
{
"sec:SUBJECT_HAS_DOCUMENT_SHARING_VOCAB": true,
"feat_attr:DOCUMENT_SHARE_TOPIC_MODEL/gt":0.9
},
{
"sec:BODY_HAS_DOCUMENT_SHARING_VOCAB": true,
"feat_attr:DOCUMENT_SHARE_MODEL/gt":0.8
}
]
```

The above DSL states that a message can be classified as having a "document sharing" topic if either of the following is true: (1) it has document sharing vocabulary in its subject line and the topic model gives it a score of higher than 0.9, or (2) it has a document sharing vocabulary in its body and the topic model gives it a score of higher than 0.8.

Figure 2B:
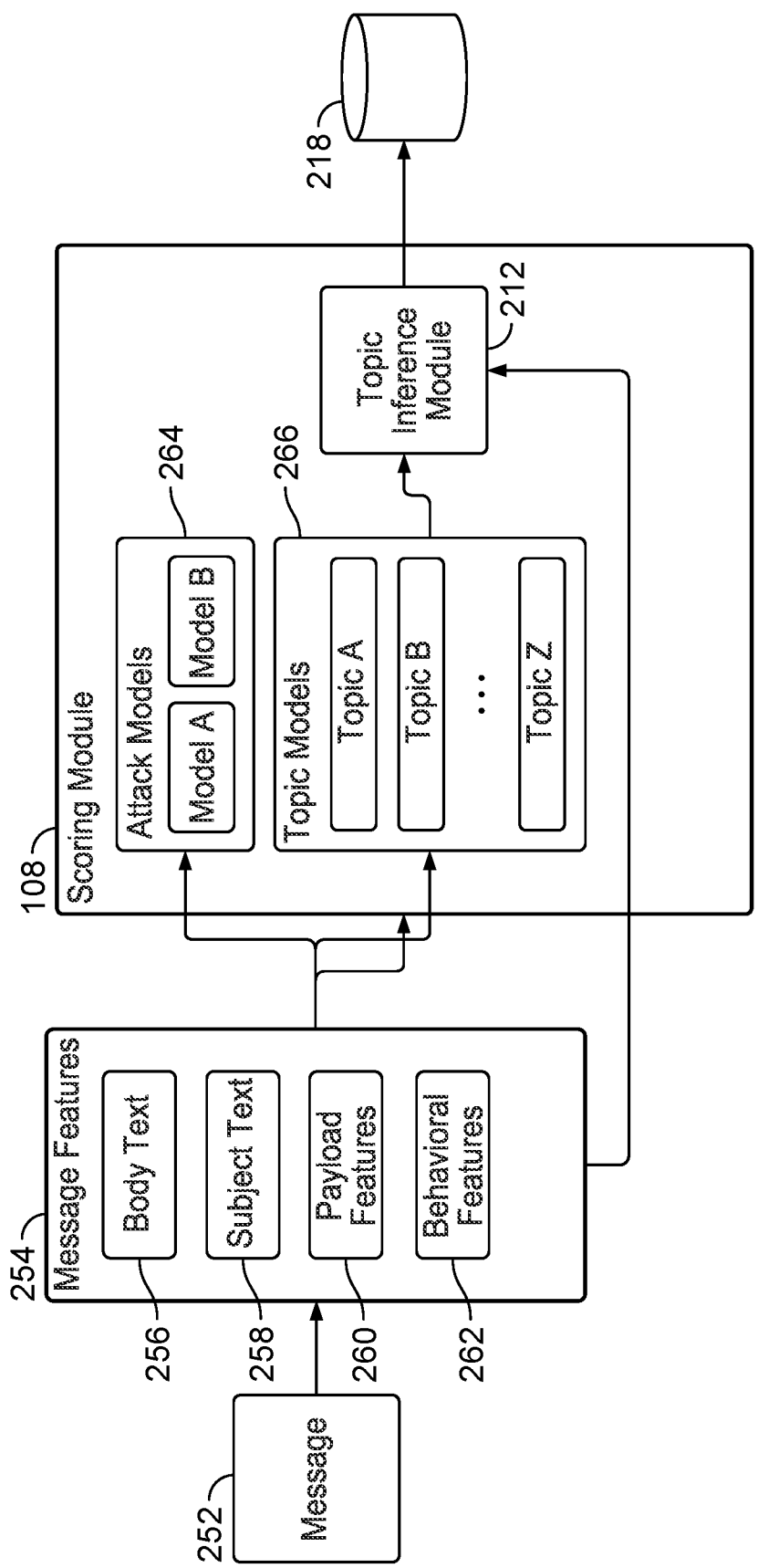
FIG. 2B illustrates an example of a message being processed by a scoring module.

FIG. 2B illustrates an example of a message being processed by a scoring module. As shown, message 252 (e.g., an email message retrieved by threat detection platform 100 from an email provider) has various features 254 (e.g., a body text 256, a subject text 258, payload features 260, and behavioral features 262) that are extracted by threat detection platform 100 and provided to scoring module 108.

Scoring module 108 includes a variety of attack models 264 (e.g., assessing whether a particular message is likely to be a phishing attack or a payment fraud attack), and topic models 266 (e.g., assessing whether a particular message discusses a corresponding topic). The extracted features are consumed by both the attack models and the topic models. In various embodiments, scoring module 108 (and subcomponents thereof) is implemented using a set of python scripts. As previously discussed, topic inference module 212 infers one or more topics to associate with message 252 and stores the message/topic(s) mapping in database 218. As applicable, if the topics assigned by topic inference module 212 are determined to be incorrect (e.g., as reported by an end user/message recipient), they can be changed (e.g., by an analyst) and any such mislabeled messages can be used to retrain topic models 266. In various embodiments, attack models 264 include one or more models related to payloads. A first example of such a model is an attachment text model which can be used to determine whether text included in a payload is potentially harmful (e.g., an attachment includes language referencing a ransomware attack). A second example of such a model is a web page model which can be used to determine whether a link included in a message is directly (or indirectly) potentially harmful. A third example of such a model is an attachment model which can be used to determine whether the attachment includes a malicious mechanism (e.g., an Excel document with problematic macros as contrasted with a plain text document or simple Microsoft Word document that does not contain any links).

IV. URL Rewriting

A. Introduction

Described herein are various techniques related to the rewriting of URLs in emails. In an example embodiment, threat detection platform 100 rewrites URLs in messages classified as suspicious (or as otherwise configured, e.g., links on messages moved to the Junk folder), redirecting end user clicks through threat detection platform 100. As an example, URLs can be rewritten to include a "urlprotect.com" prefix in which the original URL is still identifiable (e.g., by hovering over the URL or optionally inserted to the side of the URL). When an end user clicks on a message with a rewritten URL, the user is presented with an interstitial web page that provides a warning identifying the suspiciousness/potential maliciousness of the destination webpage and an option to proceed to the destination. This creates a deterrent, and also provides an extra step that aids security and awareness around cybersecurity, since additional content can be added over time. In a Dashboard (e.g., served by portal 176), enterprises are able to see which users clicked on links in suspicious messages. This can be especially useful if one of the suspicious messages is indeed malicious, and thus a false negative, since enterprises can use the information to follow up directly with their end users as needed (e.g., for password reset or further training).

Various aspects and benefits of approaches described herein in accordance with various embodiments are provided below. They include (but are not limited to):

1. Not all URLs present in messages are rewritten by threat detection platform 100. Known good URLs need not be rewritten, and known bad URLs will be completely blocked. Only those URLs deemed potentially problematic (e.g., suspicious) are rewritten (or as applicable, removed). Further, not all links within a single message need be rewritten. Instead, granular rewriting of only suspicious URLs allows the user to interact with aspects of the message determined to be benign, including benign links, while protecting the user should they choose to click on suspicious links. This maximizes user experience by preserving aspects of the message that are not suspicious (minimizing handling of their emails unnecessarily).

2. URLs are rewritten in a way that still allows for a degree of human readability. For example, if an original link directs to a particular domain (e.g., google.com or example.

com), the rewritten URL includes an indication that allows for an inference of the original (un-rewritten) domain.

3. Which users clicked a given rewritten URL, and also, which users chose to click through to the original link (e.g., after being shown an interstitial warning) are tracked and made available to enterprises (e.g., via a portal). Additional reports can also be made available, e.g., aggregating information to indicate the top n users of an enterprise who receive messages for which URLs are rewritten, the top n users of the enterprise that click through to rewritten URLs, etc.

4. Assessment of the destination page can be performed "just-in-time" (at "time-of-click") to help catch attacks in which a malicious individual sends a link to an initially benign domain and then subsequently changes the page content.

5. User feedback (e.g., confirming whether the suspicious URL is benign or malicious) can be solicited via the interstitial page at time of click.

B. Example Implementation

Suppose ACME Corporation would like to configure threat detection platform 100 to automatically rewrite suspicious URLs in its users' messages (e.g., messages received by employees such as Alice). An administrator of ACME can access an interface such as is shown in FIG. 3 (e.g., served by portal 176) and turn on the URL-rewrite feature by selecting the option shown in region 302. If desired, the administrator can configure the text shown to users (e.g., the interstitial text) by interacting with region 304. The administrator can also customize safe domains (e.g., by adding additional domains (e.g., acmecorporation.com) or removing default safe domains such as netflix.com, youtube.com, fedex.com, etc.). Another configuration an administrator can make is whether or not to rewrite URLs in signed messages (e.g., messages signed using S/MIME, DKIM, PGP). In some embodiments, if a URL has already been modified by a third party (e.g., a given URL was previously modified by SafeLinks), the third party modified URL will be rewritten by threat detection platform 100. In other embodiments, threat detection platform 100 determines the original URL (e.g., by visiting the SafeLinks URL) and rewrites the original URL.

Once the feature is turned on, end users (such as Alice) will notice that messages classified as suspicious (e.g., appearing in the Junk folder) may have at least some of their URLs rewritten (e.g., will notice that at least some URLs in such messages will start with the domain, urlprotect.com). In some embodiments, additional indications are also provided (e.g., a banner is inserted into the message, the subject line is modified, etc., to indicate that a URL in the message has been altered). Unlike in other approaches, URLs rewritten using techniques in accordance with embodiments described herein are at least partially human readable, and preserve at least a portion of the original URL so that an end user (e.g., Alice) can have some sense of what the original URL was prior to rewriting. An example format for rewriting URLs is as follows:

https://urlprotect.com/v1/ w?u=<original_url>&m=<encoded_message_ID>&r=<encoded_recipient>&s=<encoded_signature>

In the example format, the domain of the rewritten URL is "urlprotect.com." The query parameters are:
u: the original URL, percent encoded. For example, "http://google.com" would become "http %3A %2F %2Fgoogle.com"
s: an encoded signature. This is built from a hash of the query parameters message_ID, recipient_ID, URL, and version
r: encoded recipient
m: encoded message identifier In an example implementation, suppose that Alice receives a message that includes a suspicious link (i.e., message scorer 132 forms such a verdict (using decisioning layer 148 and in cooperation with link crawling service 180)). Message scorer 132 inserts the suspicious URL(s) into URL database 188 and notifies remediation service 162 that the message needs remediation. Remediation service 162 examines URL database 188 and (using URL rewriter 164) modifies the message in Alice's mailbox (e.g., using an API provided by Office 365 to modify the message body) to replace the original suspicious URL(s) with rewritten ones. Any non-suspicious URLs in the message will remain unmodified.

In an example implementation, URL rewriter 164 takes as input the parameters described above and uses that information to make a unique rewritten URL (e.g., using the format described above). If another user (e.g., Charlie) receives the same message with the same suspicious URL, if a determination is made to modify his message (e.g., to also replace the URL with a rewritten URL), the resulting rewritten URL for Charlie will be different from Alice's (because Charlie's message will have a different messageID and Charlie will have a different userID, etc.). Uniquely modifying the URLs in this manner allows threat detection platform 100 to track which user clicks on the suspicious URL and also allows threat detection platform 100 to un-rewrite the URL if the user wishes to further interact with the URL, as applicable. Further, in various embodiments, user context is taken into account when message scorer 132 determines whether or not a URL needs to be rewritten (e.g., during remediation). As an example, if the recipient routinely receives messages from the sender of the message, that may weigh against marking the URL as suspicious as compared to the same message (with the same URL) being received by a recipient who has never communicated with the sender. Accordingly, threat detection platform 100 might determine that a URL should be rewritten for one user of an enterprise (e.g., Alice) and not another at the same enterprise (e.g., Charlie).

Figure 4:
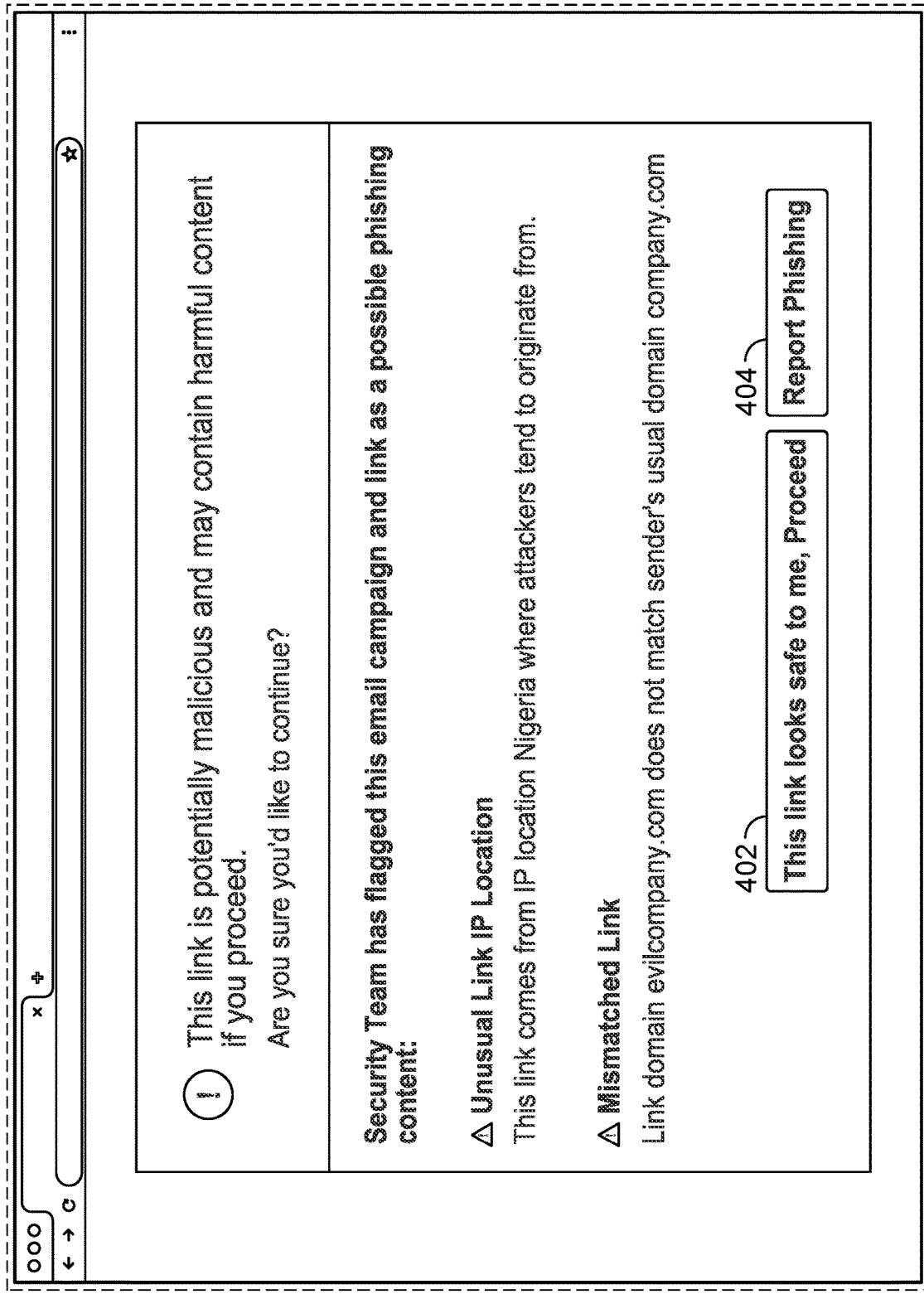
FIG. 4 illustrates an example of an interstitial page.

Rewritten URLs will redirect through threat detection platform 100 (e.g., via URL redirect service 184), ensuring that the clicks are tracked and made visible to ACME's administrators. When an end user clicks on a rewritten link included in a message, an interstitial web page will be displayed. An example of an interstitial page is shown in FIG. 4. In this example, suppose that Alice has received a suspicious message. That is, the message was not deemed either safe, or malicious, by threat detection platform 100, but received a verdict (e.g., from message scorer 132) in between. The message included at least one link that was rewritten by threat detection platform 100 (e.g., by URL rewriter 164). As mentioned above, only suspicious links are rewritten by URL rewriter 164. If, for example, the suspicious message includes a link to www.amazon.com or www.wikipedia.org, those links will remain untouched by threat detection platform 100. If the suspicious message includes a suspicious link, that link will be rewritten. In some embodiments, when a user clicks on a rewritten URL (e.g., Alice clicks on a rewritten URL in a message in her inbox), in connection with being shown the interstitial depicted in FIG. 4, threat detection platform 100 repeats its analysis of the original link (e.g., via link crawling service 180) to see if its status should be updated (e.g., from suspicious to benign or to malicious). Also referred to herein as just-in-time (and time-of-click) checking, this approach helps save resources (i.e., no need to repeatedly check a suspicious site if no user intends to click on the link), while also helping protect users against attacks where attackers replace initially benign content with subsequently malicious content.

In this example, Alice has opened the message and has clicked on one of the rewritten links. She is taken to the interstitial shown in FIG. 4 (served by threat detection platform 100). In this example, the interstitial includes explanations as to why the link that was rewritten (and that Alice clicked on) was deemed suspicious by threat detection platform 100. In particular, the original link comes from an unusual location (an IP address corresponding to Nigeria) and also the link (evilcompany.com) does not match the alleged sender's domain (e.g., company.com). As another example (not shown), Alice can be warned that the rewritten link leads to a "possible phishing link." Alice can choose to click through to the original link destination by clicking region 402. Or, Alice can simply close the window (without clicking further). She can also help confirm the link as malicious by clicking region 404 (which can be reported to an administrator, added to a review queue of platform 166, etc., as applicable). Alice's feedback can be used to help classify the URL (and thus the message) as malicious, potentially preventing it from being distributed to other users of threat detection platform 100 (and/or helping prevent them from accessing the link). Any/all of Alice's clicks can be recorded by threat detection platform 100 (e.g., added as counts to the record for the URL in URL database 188 or in another appropriate location) and appropriate actions taken in response as applicable. Also, in the event Alice does not click further, this information can be used, for example, to determine that no further actions need to be taken with respect to Alice—such as requiring that she change a password or undergo training (as contrasted with other users who click through). Further, if Alice does choose to click through, additional actions can be taken, such as alerting an administrator.

C. Portal Examples

Figure 5:
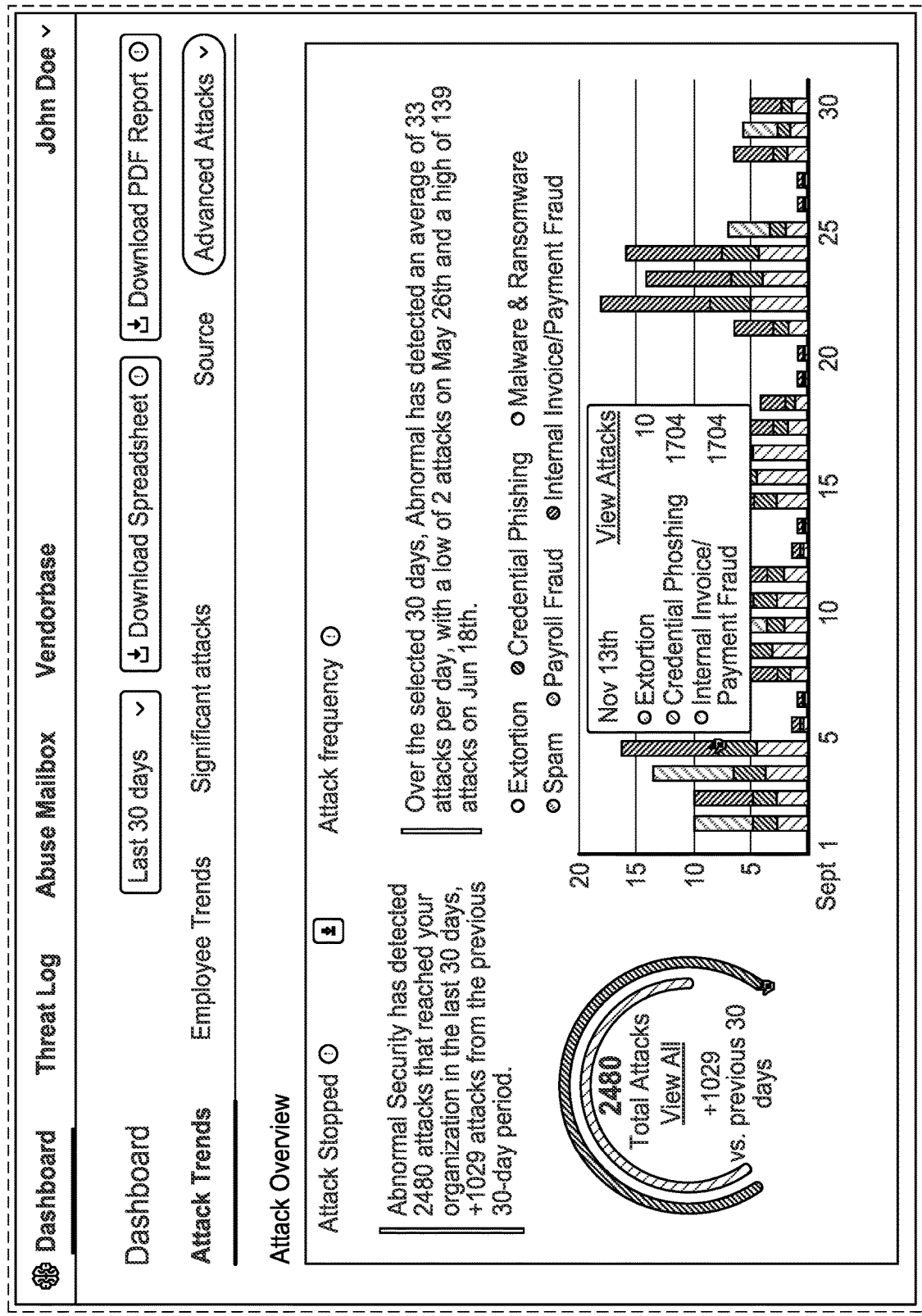
FIG. 5 illustrates an example of an administrative interface.

FIG. 5 illustrates an example of an administrative interface. In this example, an ACME administrator is viewing (via portal 176) high level information on attacks taken against ACME in the last 30 days. The administrator can scroll down through the interface to see various, more detailed information about attacks. As one example, the administrator can see a breakdown of the different ways by which different attacks have been perpetrated. As shown in FIG. 6 at 602, in the last 30 days, 512 attacks that make use of links have been attempted against ACME.

Figure 7:
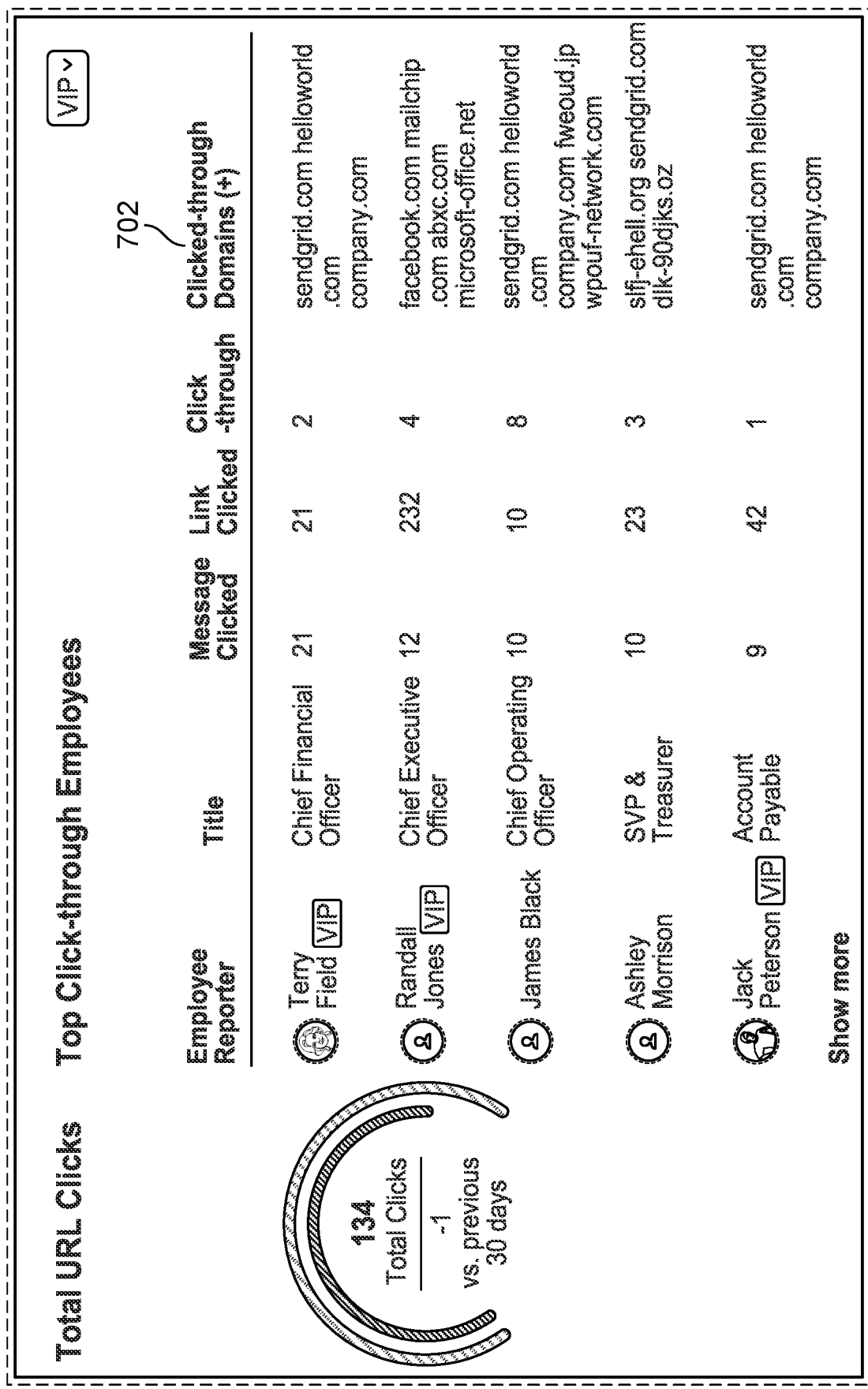
FIG. 7 illustrates an example of an administrative interface.

As shown in FIG. 7, the administrator can also see a list of the employees who, in the last 30 days, have clicked through on the most rewritten URLs. In the example shown in FIG. 7, user Terry Field (the CFO of ACME) has clicked 21 times on rewritten links across 21 messages (i.e., she has been presented with an interstitial such as is shown in FIG. 4 a total of 21 times). Of those rewritten links, she clicked through to two original URLs. User Randall Jones has clicked 232 times on rewritten links across 12 messages. Of those rewritten links, he clicked through to four original URLs. Domains corresponding to the original URLs clicked on by Terry and Randall (and others) are shown in column 702.

Figure 8:
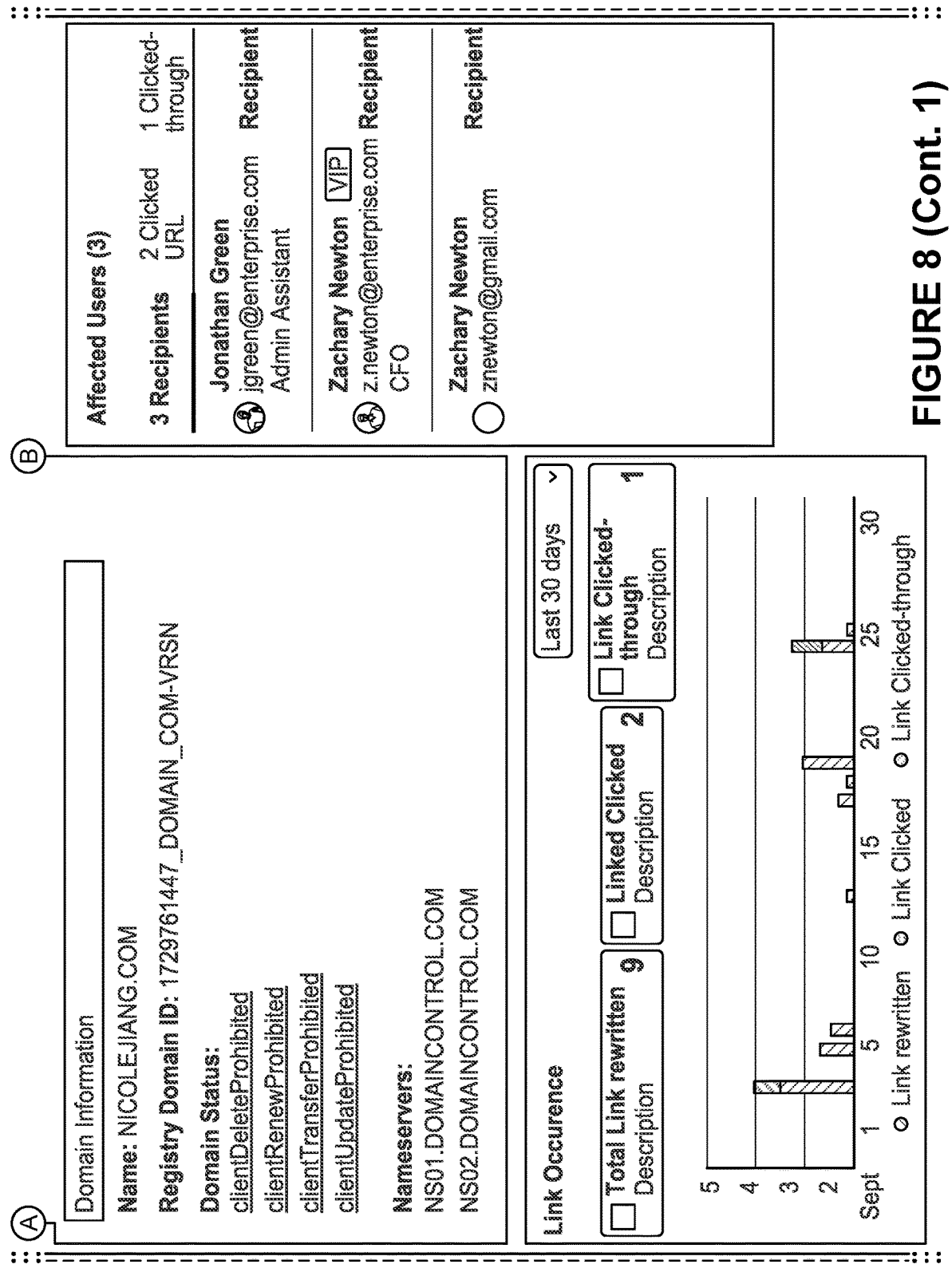
FIG. 8 illustrates an example of an administrative interface.

FIG. 8 illustrates an example of an interface an administrator can use to obtain more information about a domain. Of note, for the suspicious domain evil.com, three ACME employees have received messages that include evil.com domains. Of those three recipients, two clicked on rewritten URLs, and one clicked through to the original domain.

As mentioned above, threat detection platform 100 includes a search index 174 which can be used, for example, by an administrator to perform searches (e.g., via portal 176 or via API service 186). Examples of searches that can be performed in connection with URL rewriting are:
given a message that included a suspicious link, which users clicked through?
what are the commonly clicked suspicious URLs?
what are the commonly clicked through suspicious URLs?

D. Example Flows

Figure 9:
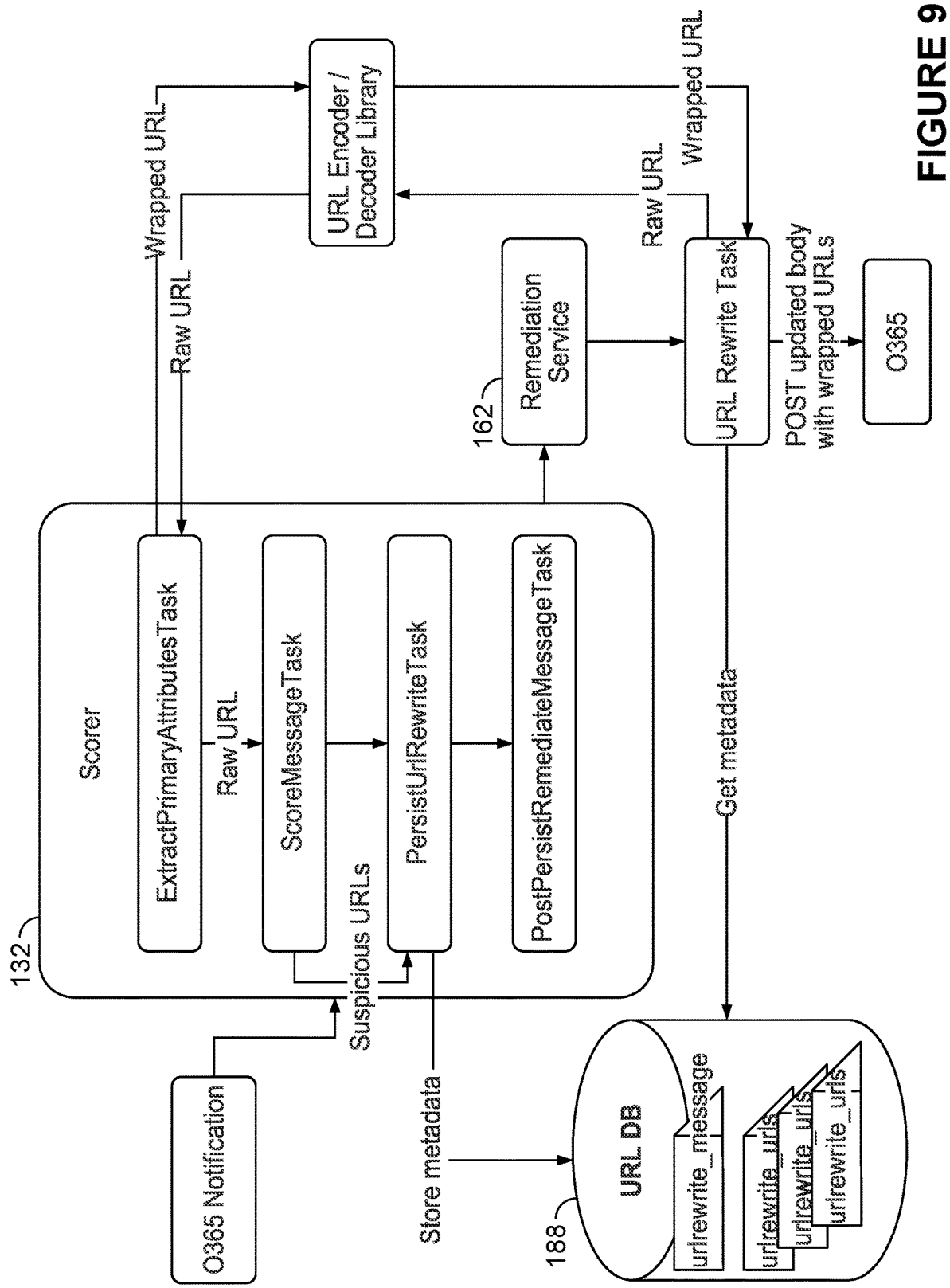
FIG. 9 illustrates an example of a URL rewriting flow in accordance with various embodiments.

FIG. 9 depicts an example of a URL rewriting flow in accordance with various embodiments. One example table included in URL database 188 is urlrewrite request. It is used to store basic metadata about a message required to fulfill the rewrite and also information about the rewrite task itself. There is one entry per request. Example schema is as follows:

| Field | Description |
| --- | --- |
| id | Incremental id per data entry |
| date_created | Timestamp when entry was created |
| raw_message_id | |
| native_user_id | |
| abnormal_message_id | Message_id if message was persisted in the ORM |
| date_rewritten | Timestamp at which rewrite completed |
| request_status | NOT_STARTED, IN_PROGRESS, DONE |

Another example table included in URL database 188 is urlrewrite_urls. It is used to store information on URLs for which rewriting was performed for each rewrite request. There is one entry per URL per message. For example, if there are three URLs to rewrite within a given message, there will be three entries mapping to a single request_id. Example schema is as follows:

| Field | Use |
| --- | --- |
| id | Incremental id per data entry |
| request_id | ID of urlrewrite_request |
| date_created | Timestamp when entry was created |
| unwrapped_url | Unique unwrapped (original) URL to rewrite |
| rewrite_status | NOT_STARTED, IN_PROGRESS, SUCCESS, FAILURE |
| rewrite_failure_reason | Reason for failure (e.g., URL not found, etc.) |

One task performed by scorer 132 is unwrapping rewritten URLs (i.e., URLs rewritten by URL rewriter 164) for scoring. Scorer 132 outputs URL decisions (e.g., malicious, suspicious, etc.). The URL decisions are stored in key value store 154 in an inMEssageWithAttributes object, along with other model scores and decisions. A task is created that stores the metadata about the message and which URLs to rewrite (e.g., in URL database 188).

When a request to remediation service 162 includes a call to the URL rewrite task, a URL rewrite request entry is created in URL database 188 and a call is made to the URL rewrite task.

The URL rewrite task is an asynchronous task. It wraps suspicious URLs using the URL wrapper library. It also updates the message body (e.g., in Office 365 or G-Suite) with the wrapped URL(s). Examples of such rewriting actions include:

Rewriting URLs in body anchor tags (HTML)
"Unremediation": URLs that have been wrapped once before are not unwrapped.
Rewrite already-wrapped URLs: If the URL is already wrapped by threat detection platform 100 or a third party, do not wrap it.
If a message can be eligible for banner injection remediation (if the enterprise has this feature enabled), reject the URL rewriting request.
Add user identifiers into wrapped URLs.
For URLs wrapped by third party services, unwrap to the original URL and then rewrite in accordance with techniques described herein.
Rewrite URLs in plain text.
Rewrite URLs in attachments.

Figure 10:
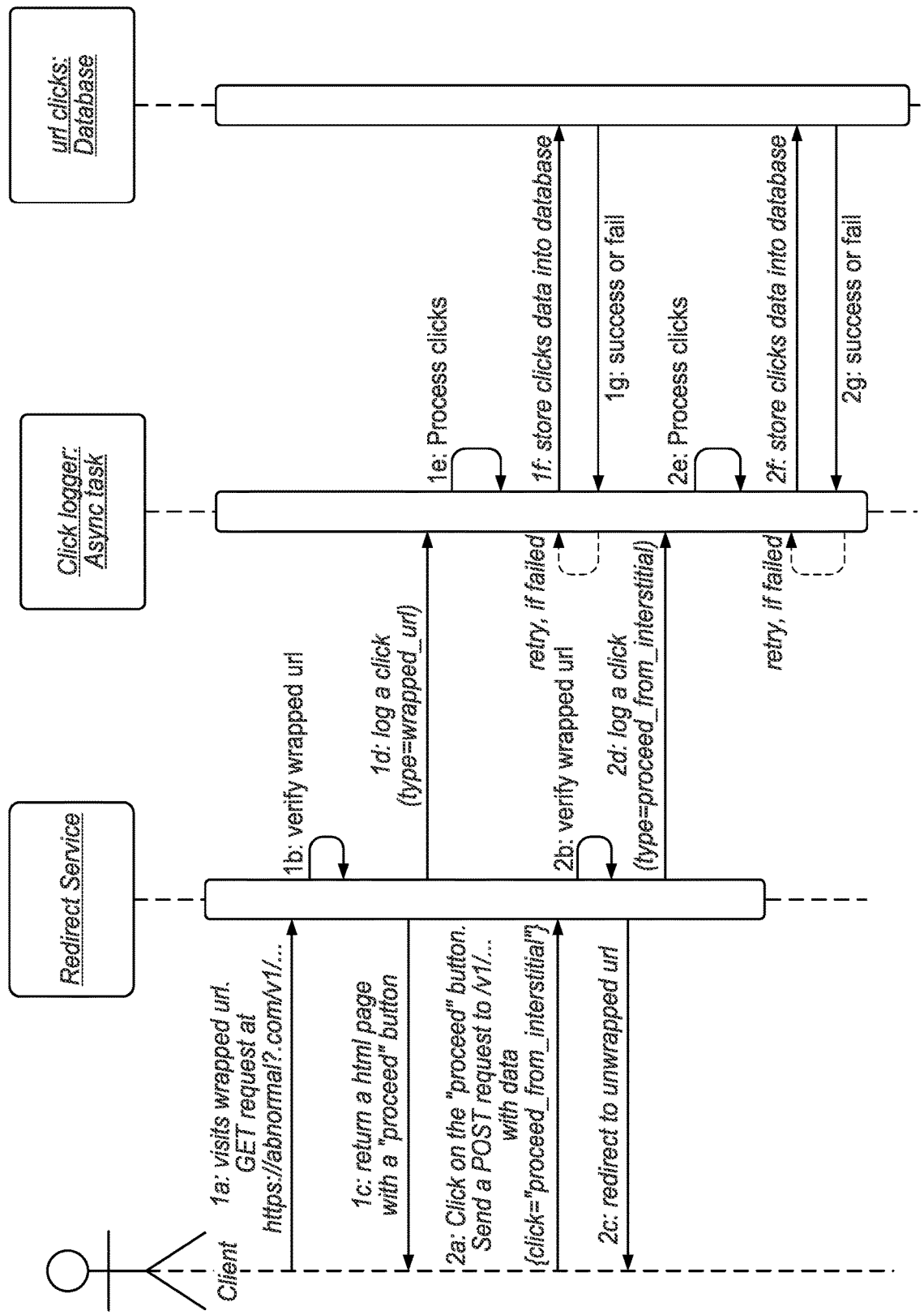
FIG. 10 is a sequence diagram illustrating the logging and storing of URL clicks.

FIG. 10 is a sequence diagram illustrating the logging and storing of URL clicks. In various embodiments, URL redirect service 184 supports two types of requests. The first is illustrated at (1a), where the redirect service processes GET requests at a wrapped (rewritten) URL with the following format:
https://<url watch domain>/v1/${k}?u=${u}&t=${t}&r=${r}&m=${m}&s=${s}
Then, (1b) after verification of the wrapped url, the redirect service will (1c) render the interstitial page at this wrapped URL. After this, (1d) a log will be sent.

The second is illustrated at (2a), where the client clicks on the "proceed" button on the interstitial page, which contains a link to a new endpoint, with an additional "c" query param/v1/${k}/
click?u=${u}&t=${t}&r=${r}&m=${m}&s=${s}&c=2
This sends a GET request with the same query parameters from the wrapped URL with an additional "c" query parameter to indicate the click type (e.g., c=2, implying proceed). The query parameter gives flexibility to track other types of clicks in future, e.g., different client application clicks. Then, similar to (1b), wrapped URL verification step (2b) is done, before (2c) the service redirects the user to the destination URL. After this, (2d) sends a log.

Clicks are logged after successful verification and responses are returned (1e-1g, and 2e-2g). In various embodiments, only verified wrapped URLs are logged:

Clicks are logged only after a successful response has been provided to the client. I.e., after the interstitial page html response is sent to the client in (1c) and after returning an HTTP redirect response to the client in (2c).
The wrapped URL is verified using the URL wrapper library.

E. Example Process

Figure 11:
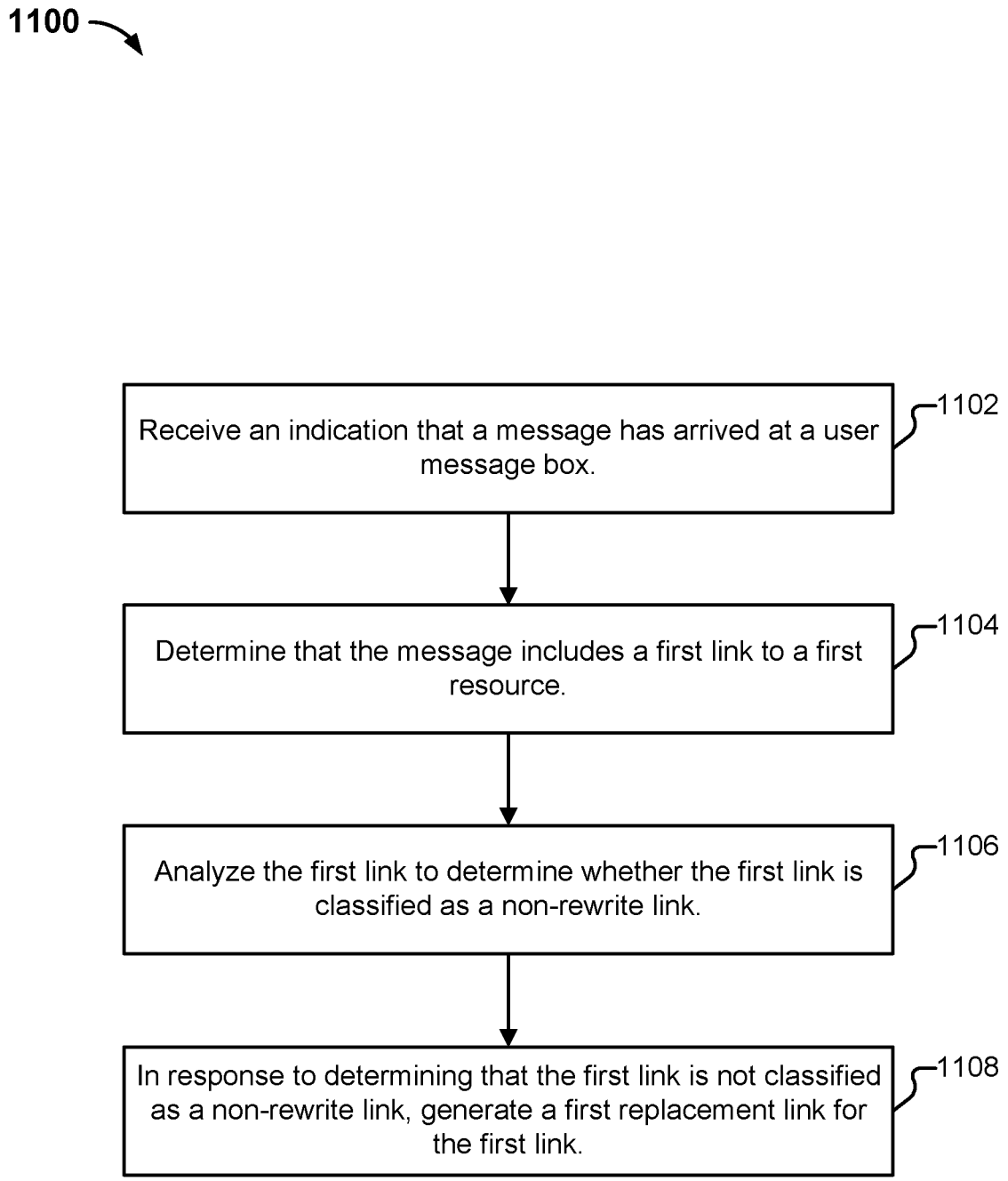
FIG. 11 illustrates an example of a process for rewriting a URL.

FIG. 11 illustrates an example of a process for rewriting a URL. In various embodiments, process 1100 is performed by a threat detection platform, such as threat detection platform 100. The process begins at 1102 when an indication that a message has arrived at a user message box is received. The indication can be either manually triggered or automatically (e.g., as part of a daily batch process). Office 365 sending threat detection platform 100 a notification that Alice has received a new message is an example of such an indication being received at 1102.

At 1104, a determination is made that the message includes a first link to a first resource. As an example, feature extraction service 126 can determine that the message (e.g., sent to Alice) includes one or more links. And, at 1106, the first link is analyzed to determine whether the first link is classified as a non-rewrite link. Various examples of non-rewrite links in accordance with various embodiments are as follows: links included in verdict=good messages; links included in verdict=bad messages; links to safe list domains (e.g., Netflix.com). As mentioned above, URL rewriting is targeted at suspicious URLs (i.e., those for which the good or bad confidence is low).

At 1108, in response to determining that the first link is not classified as a non-rewrite link, a replacement link for the first link is generated. As mentioned above, one way of accomplishing this is for message scorer 132 to insert any such URLs into URL database 188 and inform remediation service 162 that remediation of the message is needed. Remediation service 162 (via URL rewriter 164) can then rewrite the URL (and edit the message to include the rewritten URL).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication that a message has arrived at a user message box;
determine that the message includes a first link to a first resource;
analyze the first link to determine whether the first link is classified as a non-rewrite link;
in response to determining that the first link is not classified as a non-rewrite link, generate a first replacement link for the first link, wherein generating the first replacement link includes generating a particular link based at least in part on a message recipient and also based at least in part on a message identifier;
track whether a particular user associated with the user message box clicks on the first replacement link; and
provide an interstitial page to the user in response to determining that the user has clicked on the first replacement link; and
a memory coupled to the processor and configured to provide the processor with instructions.

2. The system of claim 1, wherein the processor is further configured to replace the first link in the message with the first replacement link.

3. The system of claim 2, wherein the processor is configured to replace the first link by using an application programming interface (API) provided by a service hosting the user message box.

4. The system of claim 1, wherein the processor is further configured to determine that the message includes a second link to a second resource, and wherein the processor is further configured to determine that the second link is classified as a non-rewrite link.

5. The system of claim 4, wherein the second link is classified as a non-rewrite link after being determined to be a benign link.

6. The system of claim 4, wherein the second link is classified as a non-rewrite link after being determined to be a malicious link.

7. The system of claim 6, wherein the processor is further configured to classify the message as malicious in response to determining that the second link is a malicious link.

8. The system of claim 1, wherein the processor is configured to determine that the first link is not classified as a non-rewrite link in response to determining that the first link is a suspicious link.

9. The system of claim 1, wherein the processor is configured to determine that the first link is not classified as a non-rewrite link based at least in part on an analysis of a user profile.

10. The system of claim 1, wherein generating the first replacement link includes generating a link that includes one or more recognizable elements of the first link.

11. The system of claim 1, wherein the interstitial page provides one or more reasons that the first link was not classified as a non-rewrite link.

12. The system of claim 1, wherein the interstitial page includes a representation of the first link.

13. The system of claim 1, wherein the processor is further configured to perform a time-of-click analysis on the first resource in connection with providing the interstitial page.

14. The system of claim 1, wherein the processor is further configured to classify all links within a signed message as non-rewrite links.

15. A method, comprising:
receiving an indication that a message has arrived at a user message box;
determining that the message includes a first link to a first resource;
analyzing the first link to determine whether the first link is classified as a non-rewrite link;
in response to determining that the first link is not classified as a non-rewrite link, generating a first replacement link for the first link, wherein generating the first replacement link includes generating a particular link based at least in part on a message recipient and also based at least in part on a message identifier;
tracking whether a particular user associated with the user message box clicks on the first replacement link; and
providing an interstitial page to the user in response to determining that the user has clicked on the first replacement link.

16. The method of claim 15, further comprising replacing the first link in the message with the first replacement link.

17. The method of claim 16, wherein replacing the first link includes using an application programming interface (API) provided by a service hosting the user message box.

18. The method of claim 15, further comprising determining that the message includes a second link to a second resource, and determining that the second link is classified as a non-rewrite link.

19. The method of claim 18, wherein the second link is classified as a non-rewrite link after being determined to be a benign link.

20. The method of claim 18, wherein the second link is classified as a non-rewrite link after being determined to be a malicious link.

21. The method of claim 20, further comprising classifying the message as malicious in response to determining that the second link is a malicious link.

22. The method of claim 15, further comprising determining that the first link is not classified as a non-rewrite link in response to determining that the first link is a suspicious link.

23. The method of claim 15, further comprising determining that the first link is not classified as a non-rewrite link based at least in part on an analysis of a user profile.

24. The method of claim 15, wherein generating the first replacement link includes generating a link that includes one or more recognizable elements of the first link.

25. The method of claim 15, wherein the interstitial page provides one or more reasons that the first link was not classified as a non-rewrite link.

26. The method of claim 15, wherein the interstitial page includes a representation of the first link.

27. The method of claim 15, further comprising performing a time-of-click analysis on the first resource in connection with providing the interstitial page.

28. The method of claim 15, further comprising classifying all links within a signed message as non-rewrite links.

* * * * *